US010172082B2

(12) United States Patent
Finnegan

(10) Patent No.: US 10,172,082 B2
(45) Date of Patent: Jan. 1, 2019

(54) POWER OPTIMIZED VIDEO FOR SMART HOME ECOSYSTEM

(71) Applicant: Switchmate Home LLC, Pleasanton, CA (US)

(72) Inventor: Dean Finnegan, Pleasanton, CA (US)

(*) Notice: Subject to any disclaimer, the term of this patent is extended or adjusted under 35 U.S.C. 154(b) by 0 days.

(21) Appl. No.: 15/846,005

(22) Filed: Dec. 18, 2017

(65) Prior Publication Data
US 2018/0109999 A1 Apr. 19, 2018

Related U.S. Application Data

(63) Continuation-in-part of application No. 15/368,573, filed on Dec. 3, 2016, which is a continuation-in-part of application No. 15/236,482, filed on Aug. 15, 2016, now Pat. No. 9,520,247, which is a continuation-in-part of application No. 14/617,020, filed on Feb. 9, 2015, now Pat. No. 9,418,802.

(60) Provisional application No. 62/424,467, filed on Nov. 20, 2016, provisional application No. 61/937,493, filed on Feb. 8, 2014, provisional application No. 62/065,564, filed on Oct. 17, 2014.

(51) Int. Cl.
H04W 52/02 (2009.01)
H04L 12/28 (2006.01)
H04N 7/18 (2006.01)
H04N 21/4363 (2011.01)
G05B 15/02 (2006.01)
H02J 3/14 (2006.01)
H04L 12/46 (2006.01)
H04W 4/80 (2018.01)

(52) U.S. Cl.
CPC ............ *H04W 52/02* (2013.01); *G05B 15/02* (2013.01); *H02J 3/14* (2013.01); *H04L 12/282* (2013.01); *H04L 12/2823* (2013.01); *H04L 12/2838* (2013.01); *H04L 12/4625* (2013.01); *H04N 7/18* (2013.01); *H04N 7/185* (2013.01); *H04N 21/43637* (2013.01); *G05B 2219/2642* (2013.01); *H04L 2012/2841* (2013.01); *H04W 4/80* (2018.02)

(58) Field of Classification Search
CPC ........................................................ H04J 12/50
USPC ........................................................ 370/329
See application file for complete search history.

(56) References Cited

U.S. PATENT DOCUMENTS

| | | |
|---|---|---|
| 5,245,346 A | 9/1993 | Nishimura |
| 5,898,904 A | 4/1999 | Wang |
| 5,917,405 A | 6/1999 | Joao |
| 6,571,103 B1 | 5/2003 | Novakov |
| 6,760,578 B2 | 7/2004 | Rotzoll |
| 2002/0152473 A1 | 10/2002 | Unger |
| 2003/0112126 A1 | 6/2003 | Kubler |
| 2003/0119568 A1 | 6/2003 | Menard |
| 2010/0271199 A1 | 10/2010 | Belov |
| 2010/0283579 A1* | 11/2010 | Kraus ................ G07C 9/00944 340/5.7 |
| 2011/0084815 A1 | 4/2011 | Fitzek |
| 2015/0358087 A1* | 12/2015 | Pavlas .................... H04B 10/40 398/182 |
| 2018/0078843 A1* | 3/2018 | Tran ..................... A63B 71/145 |

* cited by examiner

Primary Examiner — Dang T Ton

(57) ABSTRACT

Conservation of power while providing for controlled high capacity data transmission on demand in camera units and peripheral devices for a smart home system.

22 Claims, 10 Drawing Sheets

POWER OPTIMIZED VIDEO FOR SMART HOME ECOSYSTEM

This application is a continuation-in-part of U.S. application Ser. No. 15/368,573, filed Dec. 3, 2016, which is a continuation-in-part of U.S. application Ser. No. 15/236,482 filed Aug. 15, 2016, issued as U.S. Pat. No. 9,520,247 on Dec. 13, 2016; which is a continuation-in-part of U.S. application Ser. No. 14/617,020, filed Feb. 9, 2015, issued as U.S. Pat. No. 9,418,802 on Aug. 16, 2016; which claims priority from U.S. Provisional Patent Application No. 61/937,493, filed Feb. 8, 2014, and from U.S. Provisional Patent Application No. 62/065,564, filed Oct. 17, 2014; this application claims priority from U.S. Provisional Patent Application No. 62/424,467 filed Nov. 20, 2016 and from each of the applications enumerated in this paragraph, each of which is incorporated herein by reference in its entirety.

BACKGROUND

The benefits to be obtained from a "smart home" ecosystem are many and compelling, and may include the ability to remotely control home appliances, devices, environmental conditions, and fixtures, from across a room or from anywhere in the world; to monitor conditions in and around the home in real time, remotely and/or automatically; and to automate, coordinate, and schedule the functions of potentially every device and system in the home. A significant obstacle to the wider enjoyment of these benefits relates to the potentially disproportionate cost and difficulty of installation. Smart home devices must be sited, mounted, configured, provided with power, connected to communications, and made to interact correctly with the huge diversity of devices that may be present in the existing home ecosystem. Installation of a smart home system may require permits from building safety or other authorities, permission from landlords, employment of licensed contractors and/or tradespersons, and alterations of the physical premises that will have to be repaired if installed devices are removed or relocated. Further, devices that are inconvenient to install give up a significant potential benefit, which is the flexibility to move devices as desired, carry devices for temporary use at other locations such as hotel rooms, and remove and reuse devices in case of changing residences. It is therefore highly desirable to provide smart home systems and devices that can be installed and operated with little, and preferably no, alteration of the existing premises, and that operate reliably without frequent maintenance or battery replacement.

A recurring "pain point" for both users and providers relates to the need for smart home systems and devices to have access to electric power. Accessing line power is often impracticable because the location where a device is needed may not be near any receptacles, potentially making it necessary to obtain permits, enlist the assistance of a licensed electrician, and install additional wiring. Even where receptacles are present, installation of line-powered smart home devices in desired locations may require routing power cords in undesirable, unsightly, or unsafe ways. Outdoor locations are particularly problematic given the undesirability of exposing electric wiring to the elements. One alternative is battery power, but this too has its drawbacks: batteries run down and must be replaced or recharged, users must remember and take the trouble to do so, and batteries are bulky and heavy in direct proportion to their capacity. These limitations are particularly acute in the context of smart home devices and systems, where user convenience is a priority, and home security may be affected if devices go offline due to unnoticed battery failure.

A further challenge relates to the problem of reconciling the need for reliable signal transmission with the limitations posed by considerations of wireless range, power requirements, and signal degradation due to the physical surroundings and layout, interference from other devices and power lines, and other causes. In general, of the existing wireless communication technologies available for home automation use, those that are more effective for conserving power are also correspondingly limited in range and bandwidth. Currently, no wireless communication technology exists capable of providing both adequate range and bandwidth for home automation functions such as video transmission, and also sufficiently low power consumption to enable normal usage profiles with sufficiently long battery life for consumer acceptance.

A smart home feature of considerable importance is the ability to support remote video monitoring, where a video input device such as, for example, a device incorporating a video camera, is placed in a location of interest and configured to relay video to a device convenient for monitoring by a user, such as, for example, a smart phone or tablet computer. In various implementations video may be relayed to a user's device via a hard-wired connection, or wirelessly, or via the internet or a cellular network, or over a local area network, or by any of a variety of known modalities. However, for incorporation into a smart home system, it is desirable for a video device to be installable and removable without a need for physical wiring or connections, for all of the reasons already described. Therefore, a smart home camera or video unit should preferably be capable of operating without access to line power or other external power sources, which means that it should preferably be powered in whole or part by battery or other power source capable of being incorporated into the unit itself; and it should not require a hard-wired data connection, which means that the video must be transmitted wirelessly. However, transmission of video at adequate resolution and frame rates is quite demanding in terms of bandwidth, which raises a heretofore unsolved dilemma: wireless transmission with high enough bandwidth for video, over the distances typically of interest for smart home systems, has required the use of protocols such as, for example, Wi-Fi, whose power requirements make them infeasible for continuous battery powered operation over any time frame consistent with the needs of a smart home system.

Thus there is a need for methods, devices, and systems capable of providing reliable video monitoring, and other smart home automation functionality entailing relatively high power and/or bandwidth requirements, in user-installable self-contained components avoiding hard-wired power or data connections, disruption of existing systems, permanent alteration of physical premises, and frequent device maintenance and/or battery replacement.

SUMMARY

In general, provided herein are embodiments of novel systems, devices, and methods useful for automating, monitoring, and controlling a home or office environment and devices and/or fixtures therein, using components that could be installed by users without professional assistance and without significant preparation or physical alteration of the installation site, that do not require physical connections to power or data lines, and that provide reliable maintenance-free operation over long periods of time.

In an example embodiment, a typical smart home system may include a dispatch unit, at least one camera unit, and optionally other peripheral devices such as, for example, switch actuators, controllable electrical receptacles, motion sensors, smoke detectors, or other actuator, controller, or sensor devices. A dispatch unit may be connected to the internet, such as, for example, by Wi-Fi communication through a home Wi-Fi router connected to an internet access device. A dispatch unit may receive inputs such as, for example, user commands conveyed wirelessly and/or via internet, and may transmit signals and/or instructions to peripheral devices via a power-conserving wireless modality such as, for example Bluetooth Low Energy (BLE), which may be range-extended if needed. A camera unit may include a wireless receiver adapted to receive signals and/or instructions transmitted by a dispatch unit via the power-conserving wireless modality, and a wireless transmitter capable of operating on another wireless protocol providing sufficient range and bandwidth for transmitting video at a desired resolution and frame rate, such as, for example, a Wi-Fi protocol, with the transmitter remaining in a default power-off state except when activated by an activation signal received by the wireless receiver, and returning to the default power-off state on completion of a video transmission. Thus by separating the control function of the smart home system and the data transmission function of smart home devices into separate communication channels, each employing a different protocol, the high power drain may be confined to brief periods where high bandwidth transmission is needed, and the continuous monitoring for control signals may take place via a modality whose power consumption is minimal. In this way, very substantial improvements in battery life are achieved, making it possible for a home automation system to incorporate a camera unit that is entirely self-contained, requires no wired connections, and may function for extended periods without a need for battery replacement.

In some embodiments, an object of the present disclosure is to provide smart home devices, home automation devices, workplace automation devices, and/or security system devices having improved battery life and/or low power consumption.

In some embodiments, an object of the present disclosure is to provide for practicable remote video monitoring for a smart home system via a self-contained wire-free camera unit capable of operating for extended periods without maintenance or battery replacement.

In some embodiments, an object of the present disclosure is to provide smart home, home automation, workplace automation, and/or security system ecosystems having flexibility to accept and interact with a variety of devices having a variety of functions.

In some embodiments, an object of the present disclosure is to provide smart home, home automation, workplace automation, and/or security products that are remotely accessible and/or controllable.

In embodiments, an object of the present disclosure is to provide devices, methods, and systems for smart home systems and components that require no wired connections for their installation and/or operation.

In embodiments, an object of the present disclosure is to provide for installation of smart home systems and components without a need for specialized expertise and/or tools and/or without regulatory permissions.

In embodiments, an object of the present disclosure is to provide for smart home systems and components within the capabilities of a typical homeowner or consumer to install.

In embodiments, an object of the present disclosure is to provide devices, methods, and systems for smart home systems and components that can be installed rapidly and/or instantly and/or in a single step in their out-of-the-box configuration.

In some embodiments, an object of the present disclosure is to provide smart home, home automation, workplace automation, and/or security products that enable first time consumers to experience the lifestyle improvements afforded thereby by requiring minimal or no integration or programming for operability with an ecosystem.

In embodiments, an object of the present disclosure is to provide for rapid installation of smart home systems and components without exposing electrical wiring or other components carrying potentially dangerous electrical currents or potentials.

In some embodiments, an object of the present disclosure is to provide home automation, workplace automation, and/or security system ecosystems adapted for simple integration and/or removal and/or relocation and/or replacement of devices by users without assistance.

In some embodiments, an object of the present disclosure is to provide control, sensing, communication, and other devices for incorporation in smart home, home automation, workplace automation, and/or security system ecosystems.

In some embodiments, an object of the present disclosure is to provide control, sensing, communication, and other devices adapted to self-integrate with a smart home, home automation, workplace automation, and/or security system ecosystems and/or to integrate therein with minimal user action required.

In some embodiments, an object of the present disclosure is to provide control, sensing, communication, and other devices compatible with other home and/or workplace automation ecosystem devices and/or components available currently and/or in the future, such as, for example, Alexa, Nest, Samsung Home, and Google Home.

It will be apparent to persons of skill in the art that various of the foregoing aspects and/or objects, and various other aspects and/or objects disclosed herein, can be incorporated and/or achieved separately or combined in a single device, method, system, composition, article of manufacture, and/or improvement thereof, thus obtaining the benefit of more than one aspect and/or object, and that an embodiment may encompass none, one, or more than one but less than all of the aspects, objects, or features enumerated in the foregoing summary or otherwise disclosed herein. The disclosure hereof extends to all such combinations. In addition to the illustrative aspects, embodiments, objects, and features described above, further aspects, embodiments, objects, and features will become apparent by reference to the drawing figures and detailed description. Also disclosed herein are various embodiments of related methods, devices, apparatus, compositions, systems, articles of manufacture, and/or improvements thereof. The foregoing summary is intended to provide a brief introduction to the subject matter of this disclosure and does not in any way limit or circumscribe the scope of the invention(s) disclosed herein, which scope is defined by the claims currently appended or as they may be amended, and as interpreted by a skilled artisan in the light of the entire disclosure.

Figure 1:
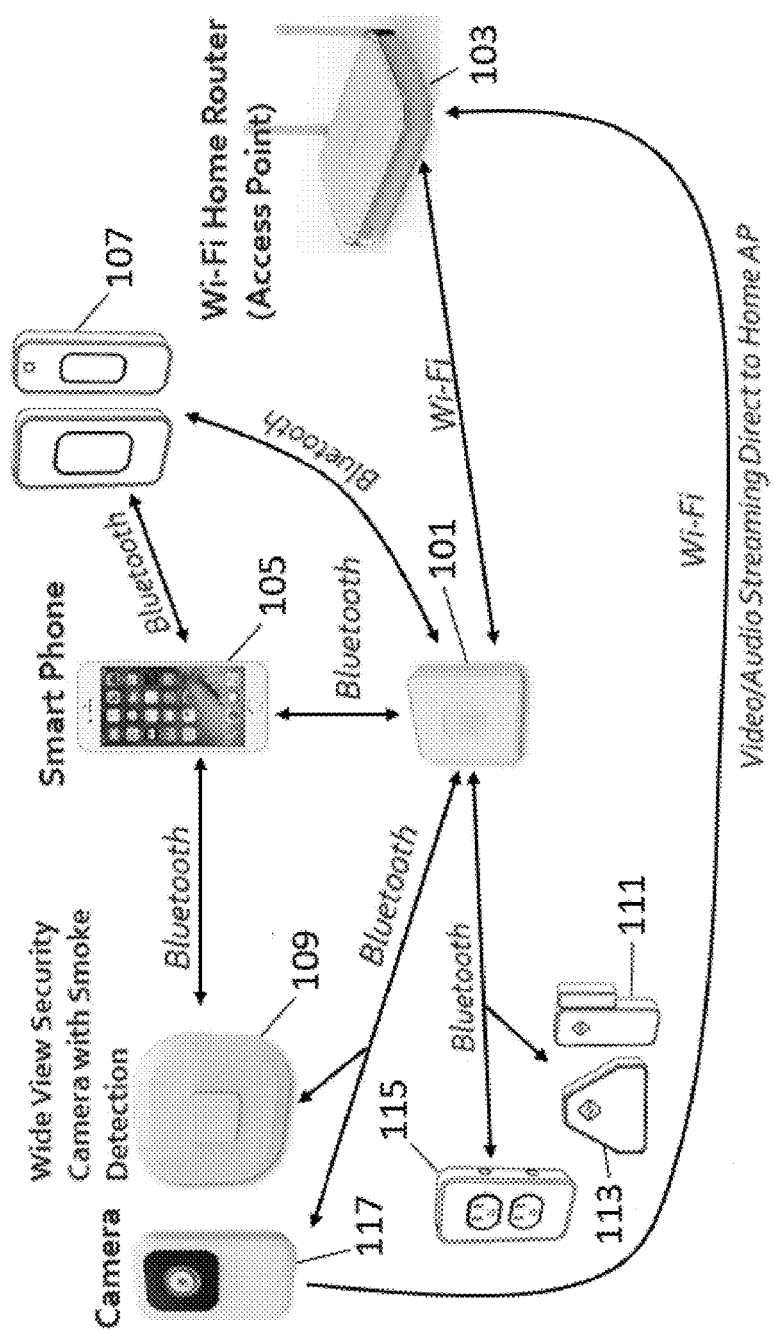
FIG. 1 shows a schematic depiction of an example embodiment of portions of a smart home ecosystem.

Figures are not to scale unless expressly so labeled, and relative positions of objects and components are illustrative. Persons of skill in the art will recognize that many other arrangements, configurations, dimensions, and selections of components are possible and consistent with the disclosure hereof, and are in no way limited to the embodiments shown in the figures.

DETAILED DESCRIPTION

Disclosed herein are embodiments of novel methods, systems, devices, apparatus, compositions, articles of manufacture, and improvements thereof useful for controlling, monitoring, interacting with, and/or incorporating into a smart home ecosystem. Disclosed herein are embodiments of smart home systems, components, devices and subsystems adapted for simple tool-free installation without wired connections, and incorporating a novel strategy for substantially extending service life between battery replacements for periods well in excess of those previously considered feasible.

Smart home systems and devices present unique challenges in that they must interact and cooperate with an already existing and typically complex technological ecosystem, and with devices and products not designed for such interactivity. A home ecosystem may include, for example, any devices, components, and/or other aspects of the physical and/or technological infrastructure relating to a deployment site of interest, such as, for example, the physical premises, structures, devices, components, and/or fixtures in and around the home or other deployment site; any environmental, utility, security, entertainment, and appliance systems and devices that may be present; any control, sensing, and/or monitoring systems and devices; communications infrastructure such as internet, telephone, smart phones, and cable television; and/or any smart home, home automation, Internet of Things (IoT) or other similar systems and/or components. In embodiments, a smart home system and/or devices and components thereof may typically be installed into the context of an existing home ecosystem and may interoperate with devices and components already present therein, turning the home ecosystem into, and becoming part of, a smart home ecosystem. In some embodiments, a smart home ecosystem could include a home environment with whatever devices, components, appliances, and other aspects may be present, plus one or more smart home devices or components such as any of those disclosed herein. Thus, a system including a video subsystem as disclosed herein, installed in a home ecosystem including a wireless internet access point, such as, for example, an internet connection accessible via a home wireless router, would be an example of an embodiment of a smart home ecosystem. A system including a video subsystem as disclosed herein, installed in a home ecosystem including a wireless internet access point, together with additional smart home peripheral devices, could be another example of an embodiment of a smart home ecosystem.

In some embodiments, a deployment context for a smart home ecosystem could include a home, apartment, or other residence premises, and a home ecosystem could include the home, apartment, or residence itself, together with its electrical and plumbing systems, appliances, entertainment systems, security and locking systems, and any other systems, objects, or components present in or around the home or apartment capable of being controlled, monitored, or interacted with by a smart home system or device. It will be apparent that many of the systems, devices, and methods disclosed herein could also be applied in other contexts, not necessarily residential. The disclosure hereof is not limited to residences and will be found useful in many other contexts, such as, for example, hotels, offices, vehicles, and workplace automation environments, and/or distributed over more than one such context. For brevity herein the words 'home' and 'smart home' will be used to denote the systems, devices, and methods disclosed herein, regardless of whether installed in and/or intended for installation in a domicile or any other deployment site, and disclosure relating to 'home' and/or 'smart home' devices and systems herein should be understood to extend to any environments where the disclosed functionality may be found useful. Although reference may be made herein to "home automation" and/or "smart home" systems, it will be apparent that the innovations, methods, devices, and systems disclosed will be found useful for many other applications, such as for example office automation, factory automation, workplace automation, and automation of commercial premises. Thus, for example, a system including a video subsystem as disclosed herein, installed in an office or other place of business including an internet connection accessible via a wireless router, could be another example of an embodiment of a smart home ecosystem.

In an exemplary embodiment as illustrated generally in FIG. 1, a smart home system according to the disclosure hereof may typically encompass a variety of devices and/or components for controlling, monitoring, and/or interacting with a home ecosystem. For example, there may be provided a coordinating device 101 which may communicate with, exchange data with, send instructions to and/or receive instructions from other devices, such as a smart phone 105 or other device. In embodiments, such communication could be by direct wireless communication with another device, or by communication with a remote device via the Internet and/or a local area network, such as through a connection via a home router 103 with an Internet access device such as a DSL or cable modem, or by communication over a cellular or other network, or in any other manner effective to communicate the desired signal or data. In embodiments, a control device, such as a smart phone or tablet having the capability to present a suitable user interface and to communicate wirelessly via a suitable protocol such as Bluetooth or Wi-Fi, may be configured to communicate instructions and/or receive data such as, for example, device status information and/or sensor data, directly with other devices of the system, or by relaying instructions and/or data through the coordinating device, or by any other communications architecture operable to transmit instructions and/or date from a source device to a destination device. For example, a smart phone or tablet could be configured to forward an instruction via a cellular network to a server and thence over an internet connection through an internet access device and home router to a coordinating device, which could dispatch the instruction to a peripheral device; data from the peripheral device could be directed back to the smart phone or tablet via the same route, or could be routed directly through the home router, bypassing the coordinating device. In embodiments, a coordinating device may employ a low energy wireless protocol, such as, for example, Bluetooth Low Energy, for command and/or control communication with one or more peripheral devices.

In embodiments of a smart home system there may be provided smart home peripheral devices, which could include any devices found useful for controlling, monitoring, and/or interacting with any desired aspects of a home ecosystem. Examples of smart home peripheral devices could include automated and/or remotely controllable actuators 107 for operating any controllable devices or services present in the home ecosystem, such as, for example, light switches, HVAC controls, or security system controls; controllable electrical receptacles 115; sensors, such as sensors for smoke 109, fire, or other environmental conditions, door and window security sensors 111, or doorbell or visitor alert sensors 113; and video devices, such as remote viewing cameras 117 and/or security cameras 109. In embodiments, smart home peripheral devices could include single function devices, or multiple functions could be combined in a single device, or in any other combination found useful in an application of interest.

In embodiments of a smart home system, as illustrated by way of example in FIG. 1, it may be found useful for a smart home system to be configured whereby communications between devices that are physically present in the home ecosystem, such as, for example, communication between a coordinating device, or a control device such as a smart phone or tablet, and a smart home peripheral device, or between a control device such as a smart phone or tablet and a coordinating device, may be conducted via a low power demand wireless protocol providing energy efficiency and minimal power demand, such as, for example, Bluetooth, Bluetooth Low Energy (BLE), Zigbee, Ant, or passive Wi-Fi, while communications requiring higher bandwidth and/or longer range may be conducted via a wireless protocol such as, for example, Wi-Fi or WiMax, having a higher capacity in terms of bandwidth, range, and/or data throughput. In general, the devices and methods disclosed herein will be found applicable and useful in relation to any current or future wireless modality in applications wherein a need exists to reduce power consumption, and there can be identified another wireless modality having lower power consumption and adequate capacity for the low power control functionality disclosed. Disclosed herein are many examples and embodiments described in terms of BLE as a low power demand wireless modality and Wi-Fi as a higher capacity wireless modality; such examples and embodiments are not limited to BLE and Wi-Fi, and other low power demand and/or high capacity modalities or protocols could be substituted insofar as they provide the functionality required for the application of interest.

The employment of higher capacity communications modalities such as, for example, Wi-Fi, presents several problems heretofore regarded as intractable in the context of smart home systems. First, as already noted, in at least some applications, to avoid the need for hard-wired connections it is highly desirable for video monitors and some other peripheral devices of smart home systems to operate on continuous battery power over long periods of time, but because of the relatively high power demands of Wi-Fi and other higher bandwidth/longer range protocols, designers and purveyors of such devices have not previously succeeded in devising a continuous Wi-Fi smart home peripheral device able to, for example, transmit high resolution video on demand, without rendering battery life impracticably short.

Figure 2:
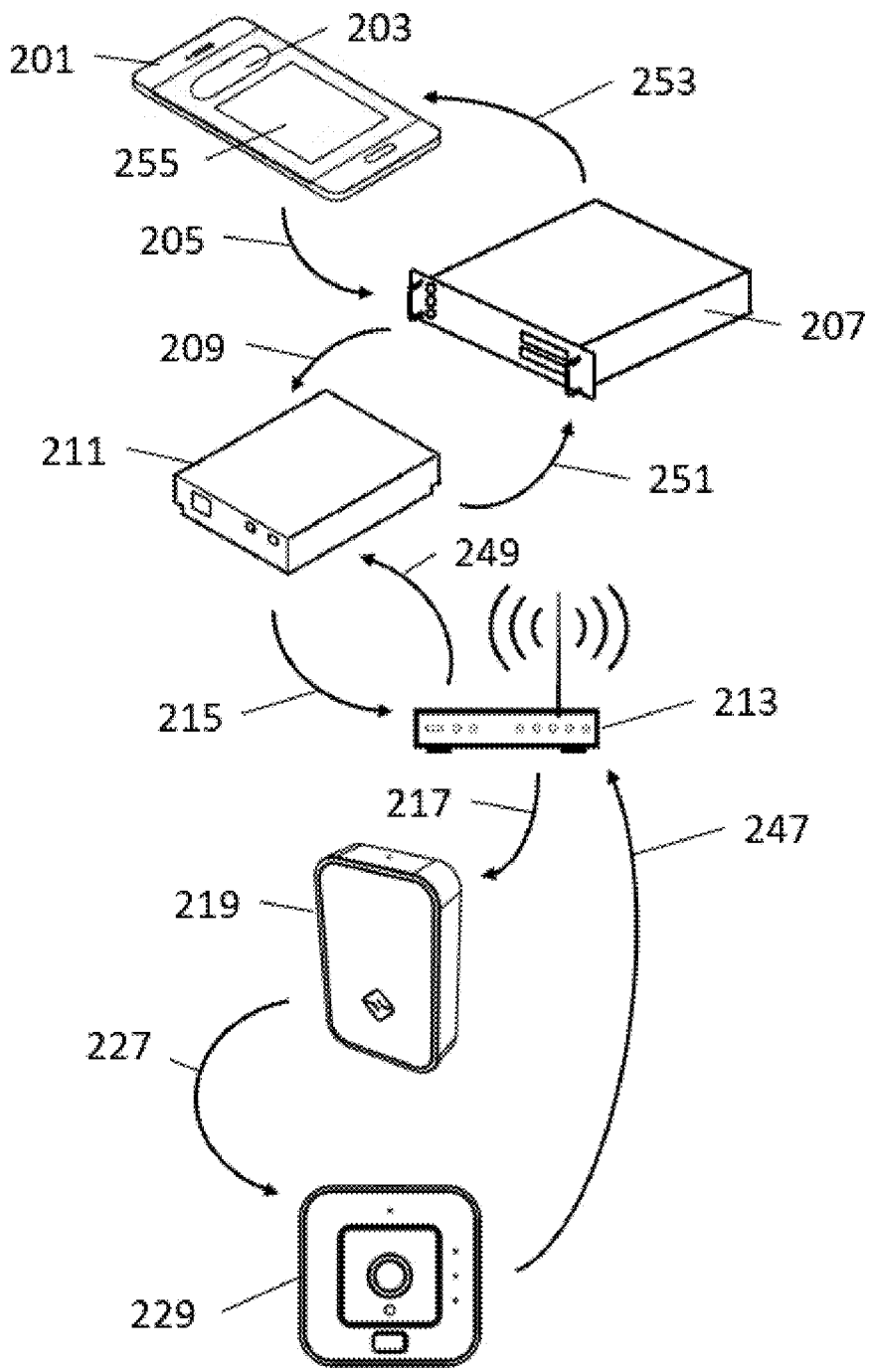
FIG. 2 shows a schematic depiction of an example embodiment of components of a smart home system including a video subsystem.

In embodiments, disclosed herein are video subsystems for use in a smart home ecosystem or other deployment context wherein there is present an internet connection accessible via a wireless internet access point, such as, for example, an internet-connected home wireless router. The video subsystem may include a dispatch unit and a camera unit and optionally could include other peripheral devices. FIG. 2 depicts schematically an illustrative example of an embodiment of a video subsystem, shown in the context of various components of a broader smart home ecosystem according to a typical basic use case in which a user is enabled to access the system from a remote location where the device(s) to be accessed are not within Wi-Fi or Bluetooth range of the user's smart phone. In the exemplary embodiment as shown, a user may use a smart phone 201 to activate a camera unit 229 of a smart home system. The camera unit may be wire-free, such as, for example, a camera unit that is battery powered and free of any hard-wired connections for power or communication, and may be self-contained in a protective housing such as a moisture-proof and/or weatherproof case. The camera unit may be adapted to transmit video over a Wi-Fi connection, but because of the very high power demand of Wi-Fi, the Wi-Fi module of the camera unit may be maintained in a default power-off state to conserve battery life, and activated only when the camera unit receives an activation signal. In a typical use case, a user's smart phone may be provided with an application that displays a GUI control 203 such as, for example, a button, which when operated by the user causes an activation message to be relayed 205 via the internet and/or a cellular network to a server 207 configured to receive and process the activation message. The activation message may be further relayed 209 by the server to an internet access device 211, such as a DSL or cable modem, of the home ecosystem in which the smart home system and/or video subsystem is installed, from where the activation message may be relayed onward 215 to a Wi-Fi router 213. From the Wi-Fi router, via a Wi-Fi connection 217, the activation message may be relayed to a dispatch unit 219. The dispatch unit may be equipped with both a Wi-Fi transceiver, enabling it to communicate with the Wi-Fi router, and a BLE transceiver for dispatching control signals to peripheral units, and could be line-powered. The dispatch unit may transmit an activation signal via a BLE connection 227 to the camera unit. Upon receiving an activation signal, the camera unit may activate its Wi-Fi transmitter from its power-off state and begin transmitting video 247. The transmitted video may be received directly by the Wi-Fi router and relayed 249 to the internet access device, thence 251 to the server, and finally relayed 253 back to the user's smart phone, where it would be rendered and displayed 255. An advantage of this novel system architecture is that in addition to providing a considerable increase in camera unit battery life, it avoids the additional latency experienced in other systems wherein video is relayed through an intermediate central controller-type device, by routing video directly through the home wireless router.

To provide for a use case wherein a user desires to access a smart home system as illustrated generally in FIG. 2 from a location within wireless range of a dispatch unit or camera unit, in some embodiments a dispatch unit may be configured to accept an activation request communicated directly from the user's smart phone by Wi-Fi or BLE, and/or a camera unit may be configured to accept an activation signal communicated directly from the user's smart phone to the camera unit's BLE receiver. Thus, in some embodiments and/or use cases, an activation message from a user's smart phone could be transmitted directly to a dispatch unit and thence to a camera unit, or could be transmitted directly from a user's smart phone to a camera unit. In various embodiments or use cases, functionality may be provided whereby an activation signal could originate, not necessarily from a user's smart phone, but from any source found useful for an application of interest, such as, for example, another device adapted and configured to convey an activation request to a server, dispatch unit, or camera unit in response to an event; from a sensor such as, for example, a motion sensor; or from an alert device adapted and configured to convey an activation request in response to an intentional action such as operation of a switch or pushbutton, or detection of a voice command or gesture. In embodiments, such sources could include separate devices or could be incorporated with the camera unit or other peripheral unit in a single device. Similarly, in some embodiments and/or use cases, video transmitted by a camera unit upon activation could be received by any Wi-Fi enabled device within range. Thus, for example, if the user's smart phone is within range, the transmitted video could be received directly by the smart phone, or the transmitted video could be received directly by a local monitoring or display device.

Figure 3:
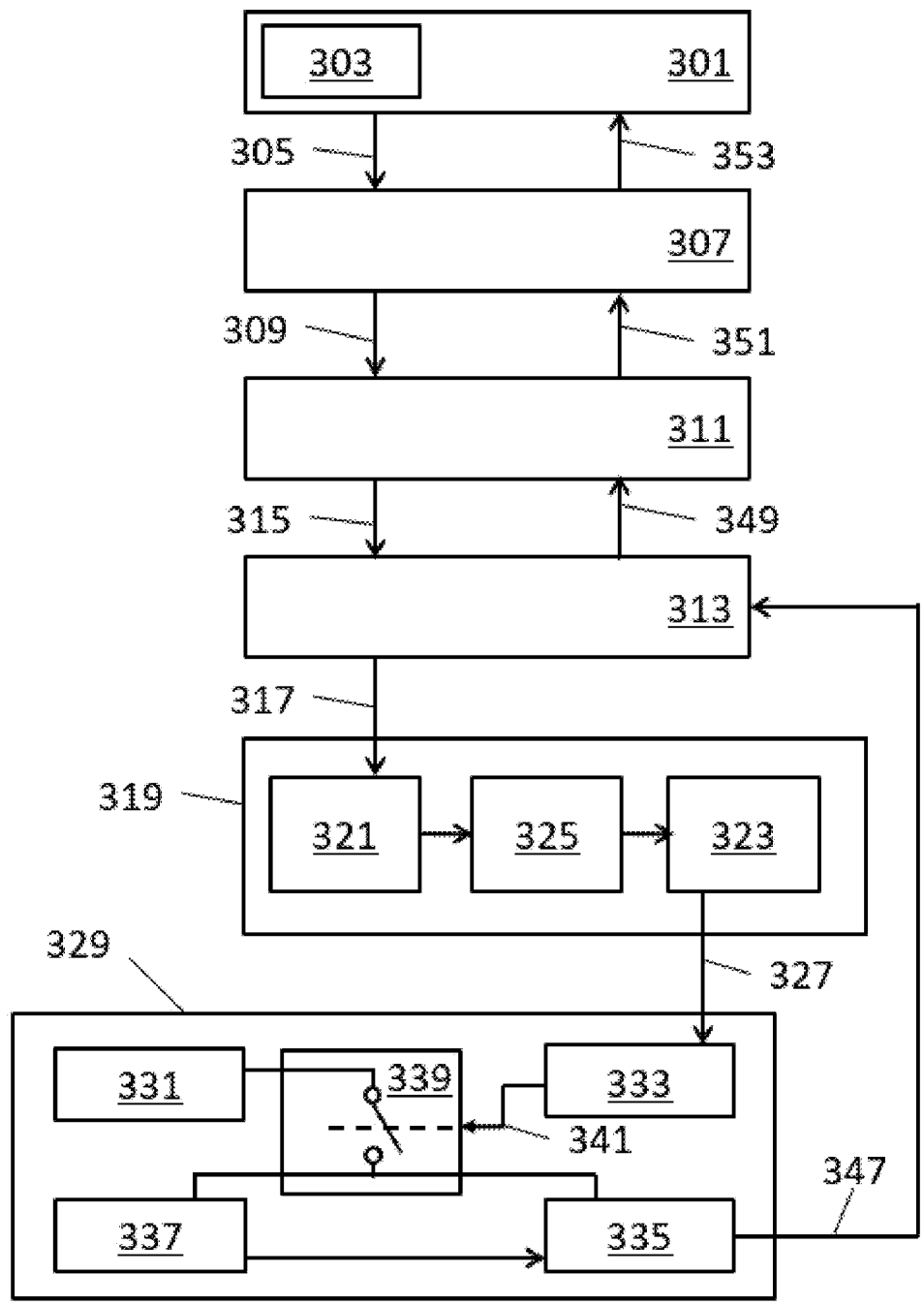
FIG. 3 depicts a block diagram of an example embodiment of components of a smart home system including a video subsystem.

More generally, in embodiments as depicted schematically in FIG. 3, there may be provided a smart home system or subsystem including a dispatch unit 319 and a peripheral unit 329, wherein the dispatch unit is adapted and configured to receive messages and/or data via a high performance wireless communication modality, optionally process the received messages and/or data, and transmit messages and/or data via a low energy wireless communication modality; and the peripheral unit is adapted and configured to receive an activation signal via the low energy wireless communication modality, and to transmit messages and/or data, which may originate from the peripheral unit and/or components and/or associated devices thereof, via a high performance wireless communication modality, which, in embodiments, could be but need not necessarily be the same high performance wireless communication modality as the dispatch unit is adapted to receive. In embodiments, a peripheral device may generate data in quantities and/or at rates exceeding, and perhaps substantially exceeding, the capacity of a low energy wireless communication modality. A low energy wireless communication modality or protocol may include any of the current or future wireless modalities or protocols recognized by persons of skill in the art as low energy or low-power-demand protocols, such as, for example, Bluetooth, Bluetooth Low Energy (BLE), Zigbee, Z-wave, Ant, and passive Wi-Fi. A low energy wireless communication modality or protocol could include any current or future wireless modalities or protocols providing bandwidth at least adequate for transmitting activation messages, such as bandwidth of at least about 0.5 Kbps, or about 1 Kbps, or 2 about Kbps, or 5 about Kbps, and having receiver or transceiver power demand less than about 150 uA, or less than about 100 uA, or less than about 75 uA, or less than about 50 uA in a non-transmitting (except for required handshaking and/or advertising) and continuous monitoring or scanning mode (which may include modes wherein the transceiver is maintained in a reduced power state and a channel is monitored for messages at short predetermined intervals such as less than about 500 ms, or about 300 ms, or about 200 ms, or about 100 ms, or about 50 ms, or about 25 ms, or about 10 ms, or about 1 ms). A high performance wireless communication modality or protocol may include any of the current or future wireless modalities or protocols recognized by persons of skill in the art as having bandwidth and or range adequate for ordinarily demanding data exchange, such as bandwidth of at least about 1 Mbps, about 5 Mbps, about 11 Mbps, about 20 Mbps, about 54 Mbps, about 100 Mbps, about 200 Mbps, or about 300 Mbps and range of at least about 25 m, or about 35 m, or about 50 m, or about 90 m, or about 120 m. Examples of high performance wireless communication modalities could include Wi-Fi, WiMAX, and IEEE 802.11 protocols.

In some embodiments wherein data to be transmitted includes video data, it may be found desirable to employ a device operating on a high-definition video-capable wireless protocol, which may include any current or future wireless modality or protocol recognized by persons of skill in the art as providing bandwidth adequate for transmission of video data at a resolution and frame rate suitable for high-definition video according to the requirements of an application of interest. In embodiments, for example, a high-definition video-capable wireless protocol could include a protocol providing for a resolution of at least 1920×1080 pixels, or at least 1280×720 pixels, or at least 854×480 pixels, or at least 640×360 pixels, and a frame rate of at least about 1 fps, or at least about 4 fps, or at least about 8 fps, or at least about 16 fps, or at least about 24 fps, or at least about 48 fps. In some embodiments, a high performance wireless communication protocol could be employed as a high-definition video-capable wireless protocol.

In some embodiments, a wireless communication between a device and another device may take place via a low energy wireless channel, which may refer to a two-way and/or one-way exchange of signal(s) and/or data taking place via a low energy wireless communication modality, and could include signals and/or data for establishing or maintaining a continuing connection or exchange between the devices. In some embodiments, such as where the low energy wireless modality comprises BLE, a device may emit advertising signals on a predetermined interval, which may be adjusted to achieve a desired power consumption level, with longer intervals providing reduced power consumption but at the cost of increased latency. Thus in some embodiments of a smart home peripheral device, such as a camera unit, for a practicable balance of power conservation vs. latency, and depending on the demands of the application, where relatively fast response is needed the advertising interval may be set to between about 250 ms and about 350 ms; or between about 150 ms and about 250 ms; or between about 50 ms and about 150 ms; or between about 20 ms and about 50 ms; while in applications where a short delay in response is tolerable the advertising interval could be set to between about 350 ms and about 750 ms; or between about 750 ms and about 1.5 s; or between about 1.5 s and about 3 s; or between about 3 s and about 24 s. In some embodiments, a wireless communication between a device and another device may take place via a high performance wireless channel, which may refer to a two-way and/or one-way exchange of signal(s) and/or data taking place via a high performance wireless communication modality, and could include signals and/or data for establishing or maintaining a continuing exchange between the devices.

In embodiments as depicted schematically in FIG. 3, and referring to an exemplary use case wherein activation of a camera unit or other peripheral device is desired to be initiated remotely, an initiation device 301, such as, for example, a smart phone, tablet, or personal computer, capable of communicating with a server via the internet, a cellular network, a local area network, or by any other operable communication modality, may be provided with an application adapted and configured to respond to a user control 303 for operating a peripheral device 329 incorporated in a smart home system. In an embodiment, a user control may include any device, component, user interface widget, sensor, or other object adapted to detect a user intention and thereupon produce a response in another device or application. The peripheral device may monitor a low energy wireless channel to minimize power consumption by the peripheral device. Upon operation of the user control by the user, an activation signal may be communicated to the peripheral device over such channel, whereupon the peripheral device may be made to activate a high performance wireless channel, using a transmitter that is kept in a power-off state prior to such activation, so as to conserve power, and returned to a power-off state after a transmission is completed. Thus, in an embodiment as illustrated in FIG. 3, the application may cause an activation request 305 to be communicated from the initiation device to a server 307. From the server, the activation request may be relayed 309 to an Internet access device 311, typically located in the home or other location served by the smart home system to which the peripheral device belongs. An internet access device may include any device or interface operable to establish a connection to the internet. Examples of an internet access device could include a DSL or cable modem, a satellite internet transceiver system, and a device for accessing the internet via a cellular telephone or data network. In embodiments, a wireless router or wireless internet access point could include any device or combination of devices for providing wireless communication between another device and the internet; thus a wireless router could be a standalone component or could be one component of a wireless internet access point of which another component could include a wireless internet access device. Thus a wireless internet access point could include any device or combination of devices operable to allow other devices to connect wirelessly to the internet. In the embodiment shown, the wireless router 313 may receive the activation request 315 via the Internet access device and relay 317 the activation request via a wireless communication to a dispatch unit 319, using any protocol or modality with which the router and the dispatch unit can compatibly communicate, which could be, for example, a high performance wireless protocol such as Wi-Fi.

In some embodiments as illustrated in FIG. 3, a dispatch unit may include at least wireless receiver 321 compatible for wireless communication with a home router or wireless internet access point, and could include any wireless receiver operable to receive an activation request transmitted by a wireless router or wireless internet access point present in the smart home ecosystem; a dispatch transmitter 323 operable on a low energy wireless protocol, such as a BLE or other power-conserving transmitter; and an interface 325 for operatively connecting the wireless receiver and the dispatch transmitter. An interface of a dispatch unit may include any device and/or component, implemented in hardware, software, firmware, or any combination thereof, for processing and/or relaying an output of the home internet access point compatible wireless receiver whereby upon a predetermined signal (such as, for example, a signal encoding an activation request) received by the wireless receiver, the dispatch transmitter is made to transmit a predetermined transmission (such as, for example, a transmission encoding an activation signal). In embodiments, an interface could be a simple interface merely relaying a message received by the wireless receiver to the dispatch transmitter for transmission with minimal or no change in message content, or could include a device or component for processing a message received by the wireless receiver to a form and manner compatible for transmission of the signal by the dispatch transmitter, or could include a device or component or logic for generating and causing transmission of a new or different transmission. In embodiments, an activation request received by the wireless receiver and the activation signal transmitted by the dispatch transmitter could comprise identical, substantially similar, or different message content.

In embodiments as depicted in FIG. 3, a dispatch unit may transmit 327 an activation signal via a low energy wireless channel, such as, for example, BLE, to a smart home peripheral device 329. The smart home peripheral device could include any device having functionality as a source of data of interest, such as, for example, a camera device or other device for transmitting sensor or other monitoring data. The smart home peripheral device may be powered by a self-contained power source 331. In embodiments, a self-contained power source may include any power source (such as, for example, one or more batteries housed within the peripheral device) capable of providing operating power to a peripheral device without any hard-wired or other tangible physical connection to any power source external to the peripheral device. In embodiments, a wire-free peripheral device may be employed so as, for example, to improve portability and/or convenience of installation. A wire-free peripheral device may include any peripheral device operable to carry out its normal functionality in ordinary usage without any hard-wired or other tangible physical connection to any external power source or data channel. In embodiments, a wire-free peripheral device may include a device that derives its operating power from a self-contained power source and conducts any data communication wirelessly. In embodiments, a self-contained power source could comprise or be supplemented with any energy source not requiring any hard-wired or tangible physical connection external to the peripheral device, such as, for example, a photovoltaic cell or wireless energy transmission device, which could, for example, be used in conjunction with one or more batteries to supply additional power and/or replenish battery charge.

In embodiments, a peripheral device may include at least a receiver 333 operable on a low energy wireless communication protocol and operable to receive an activation signal from the dispatch unit, and a wireless data transmitter 335 operable on a high performance wireless communication protocol and/or a high-definition video-capable wireless protocol, for transmitting the output or data of the peripheral device, such as, for example, video output from a camera module 337 or other sensor found useful for an application of interest. The wireless data transmitter of the peripheral device may be maintained in a power-off state except when activated by an activation signal, thereby substantially conserving battery power and extending battery life. When an activation command is received by the low energy receiver 333, a controller 339 is operated 341 to activate the wireless data transmitter, and optionally also a camera module, sensor, or other data source, to a power-on state and to control the peripheral device to transmit video, sensor, or other output by a high performance wireless and/or high-definition video-capable wireless transmission 347 from the wireless data transmitter. In embodiments, a controller may include any device or component operable to control a transmitter from a power off state to transmit video or other data from a camera module or other sensor or data source. In embodiments, a controller could include, for example, a simple controlled switch or relay, or a digital logic circuit for activating the transmitter and optionally the camera module or other sensor, or a microcontroller and associated circuitry for controlling the transmitter and any other components needing to be controlled. The transmission of video or other sensor output or data may be received by the home wireless router 313, relayed 349 to the Internet access device 311, thence over the Internet 351 to the server 307, and finally returning via internet, cell network, or other communication path 353 to a data consuming device. A data consuming device could, in embodiments, include any device having functionality for receiving, processing, displaying, or otherwise making use of the data transmitted from the peripheral device, such as, for example, a video monitor, personal computer, tablet computer, or smart phone. A data consuming device could commonly, in embodiments, include the user's smart phone or other device used to initiate the activation of the peripheral device.

Many variations of the foregoing are possible and encompassed by this disclosure. In some embodiments, video or other sensor or data output transmitted by the peripheral device may be received directly, without relay through a router, wireless internet access point, server, or other network, by any wireless receiver-equipped device compatible with a protocol used by the peripheral device for transmission and within wireless range of the peripheral device, such as, for example, a user's smart phone, tablet, or personal computer provided with a compatible receiver or other data consuming device. In some embodiments, an activation request may be transmitted directly to a dispatch unit or directly to a peripheral device from another compatible device within range, such as, for example, a user's smart phone, tablet, or personal computer, or a sensor device or alert device, provided with a compatible transmitter. When activation requests and/or signals are relayed or transmitted, they may be passed on in the same form, or processed, supplemented, edited, or re-created in a different form at any point, in any manner found useful for an application of interest. The disclosed system and its component devices need not necessarily be implemented in the specific functional units organized as depicted in FIG. 3; rather, components may be integrated, combined, modularized, or otherwise arranged in any manner operable to provide the disclosed functionality. In some embodiments, although a power-off state will generally be preferred for optimal power conservation, the default state of a wireless data transmitter of a peripheral device could be a quiescent state other than a power-off state, such as in applications where power conservation constraints are less demanding.

In embodiments, there may be provided applications, which may be implemented in software, hardware, firmware, logic circuitry, or any combination thereof, which may provide functionality for user interaction with a smart home system and/or video subsystem via a smart phone, tablet, personal computer, or other device. For example, an application may be configured to display a user interface offering a user the option to activate a camera unit, and upon selection of that function by the user, communicate an activation message to a server for relaying to a dispatch unit. An application may be configured to display or otherwise output to a user an alert message originating from an alert device, and/or a message informing the user of the status of a camera unit. An application may be configured to offer a user functionality to display video transmitted by a camera unit. An application may be configured to provide a user interface for control by a user of any functionality of a video subsystem and/or any peripheral or other device or component of a smart home system.

Figure 4:
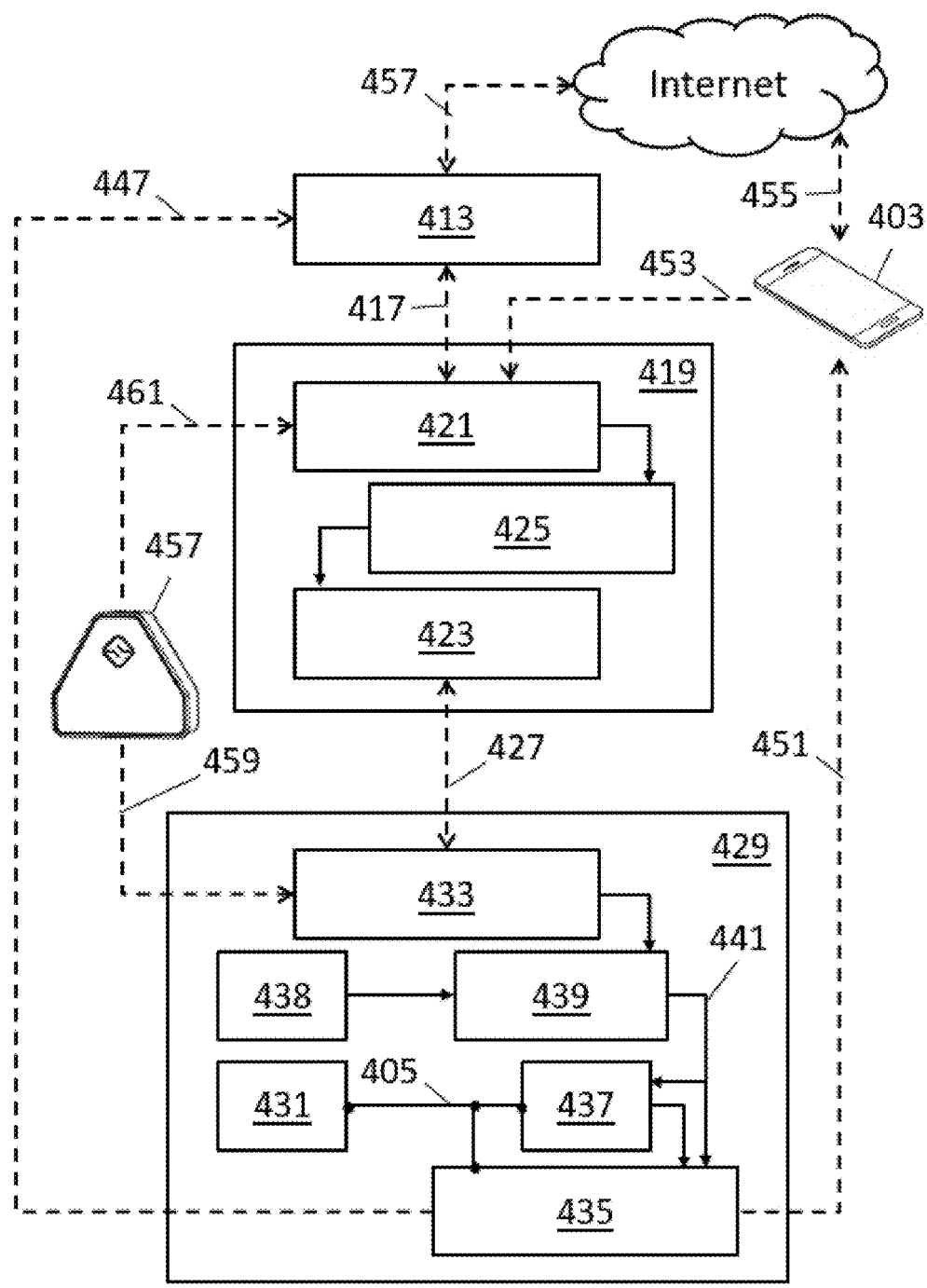
FIG. 4 depicts a block diagram of an example embodiment of a dispatch unit and camera unit and other components.

In embodiments as depicted in FIG. 4, there is provided a video subsystem for a smart home ecosystem having an Internet connection accessible via a wireless router or other wireless internet access point 413. The video subsystem may include a dispatch unit 419, and a wire-free camera unit 429. A dispatch unit of a video subsystem may include a wireless receiver 421 operable on a wireless protocol compatible for communication 417 with the wireless router or wireless internet access point, a wireless transmitter 423 operable on a BLE or other low energy wireless protocol, and an interface 425 adapted and configured to monitor the signal traffic received by the wireless receiver and, in the event of detecting therein a predetermined control signal such as an activation request, operate the wireless transmitter to transmit 427 an activation signal via the BLE or other low energy wireless protocol. A wire-free camera unit may include a wireless receiver 433 operable on a BLE or other low energy wireless protocol compatible with the transmission protocol of the wireless transmitter of the dispatch unit; a camera sensor or module 437; a wireless transmitter 435 operable to transmit 451 on a high-definition video-capable wireless protocol such as, for example, Wi-Fi, and controllable to a default power-off state; a self-contained power source 431 for supplying power 405 to the camera sensor and/or wireless transmitter; and a controller 439 adapted and configured to monitor the wireless receiver and, in response to an activation signal received via the wireless receiver, operate the camera sensor or module and wireless transmitter 435 to transmit a high-definition video transmission and thereafter return the wireless transmitter to its default power-off state. In embodiments, a video subsystem may be operated by controlling an initiating device 403, such as, for example, a user's smart phone or tablet, to convey to the dispatch unit an activation request, which could be transmitted directly 453 to the receiver 421 of the dispatch unit, or could be conveyed to the dispatch unit by any other operable path, such as by a transmission 455 over an Internet connection and thence 457 to the home wireless router which could convey 417 the activation request to the dispatch unit. When an activation request is received by the dispatch unit, the dispatch unit may transmit an activation signal via the low energy wireless transmitter of the dispatch unit, to be received by the compatible receiver of the camera unit, whereupon the controller 439 of the camera unit, upon detection of the activation signal, may control 441 the high-definition video-capable wireless transmitter of the camera unit to activate from its default power off state and transmit video obtained from the camera sensor or module, and after completion of the requested transmission, return the high-definition video-capable wireless transmitter, and optionally the camera sensor or module, to the default power off state. The video transmission may be transmitted directly 447 to a wireless internet access point and thence relayed over the internet to a user's smart phone or other display device, or could be transmitted directly 451 to a user's smart phone or other display device if in range.

In embodiments as illustrated in FIG. 4, a video subsystem may include an alert sensor module, which may include an internal module 438 integral with and/or incorporated as part of a camera unit, and/or may be provided as a module 457 separate from and/or in a different housing from the camera unit. In embodiments, an alert sensor module may include any device and/or component having functionality to detect an event of interest and thereupon communicate (directly or indirectly) an alert signal to the controller of the camera unit, whereupon the controller of the camera unit may control the wireless transmitter of the camera unit to enter an operating state and operate the camera sensor and wireless transmitter of the camera unit to transmit a high-definition video transmission and thereafter return the wireless transmitter to its default power-off state. In embodiments, an internal alert sensor module could communicate an activation signal directly to the controller of the camera unit, or a separate alert sensor module could transmit 459 an alert signal wirelessly to the controller of a camera unit, or could transmit 461 an alert request wirelessly to the receiver of the dispatch unit, which would then transmit an activation signal to the camera unit. In embodiments, an alert sensor module could be adapted and configured to respond to any event detected by any sensor found useful for an application of interest, such as, for example, a user control, a motion sensor, an infrared sensor, a switch, a doorbell button, a temperature sensor, a smoke detector, an intrusion sensor, or an audio sensor.

Figure 5:
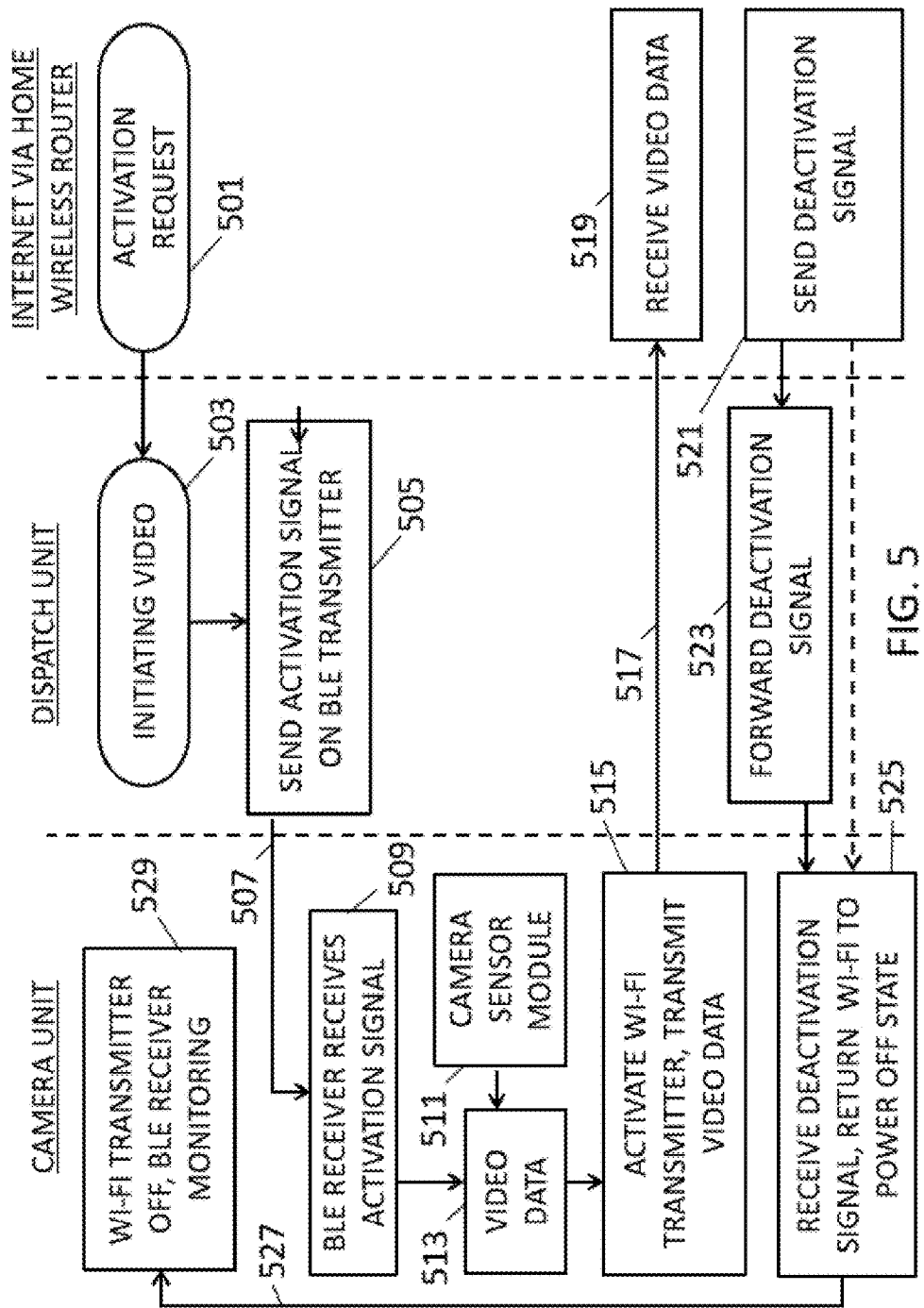
FIG. 5 depicts a flow chart indicating an embodiment of an operating sequence of a video subsystem of a smart home ecosystem.

In FIG. 5 there is shown a flow chart depicting an activation cycle of an embodiment of a video subsystem in an exemplary use case according to the disclosure hereof and illustrating methods of operating a video subsystem. In the embodiment illustrated, after an activation request is initiated 501, the activation request may be conveyed via a home wireless router or other communication channel to a dispatch unit which may thereupon initiate 503 the activation of a video transmission by a camera unit. In response to the activation request, the dispatch unit may transmit 505, via its BLE or other low energy wireless protocol transmitter, an activation signal 507 which may be received by the BLE or other low energy wireless protocol receiver 509 of the camera unit. Upon receiving the activation signal, the camera unit may activate its camera sensor module 511 to produce video data 513, and may activate 515 its high-definition video-capable wireless transmitter to transmit 517 the video data. The video data may be transmitted via a protocol, such as, for example, Wi-Fi, compatible with the home wireless router, and may be received 519 by the home wireless router and thence relayed to a destination device, such as, for example, a user's smart phone. In the embodiment illustrated, the user could terminate the video transmission by sending 521 a deactivation signal via the home wireless router to the dispatch unit, which could be forwarded 523 by the dispatch unit to the camera unit, or could transmit a deactivation signal via the Wi-Fi channel on which the video is being transmitted, or in any other manner operable to communicate a deactivation signal to the camera unit. Upon receiving 525 the deactivation signal, the camera unit may return 527 the Wi-Fi or other high-resolution video-capable transmitter to its default power-off state 529, and optionally return the camera sensor module to a power off or other quiescent state, with the BLE or other low energy receiver continuing to monitor for new activation signals. The foregoing sequence of operations may be varied and/or reordered in any manner preserving the functionality of providing for maintaining the high-definition video-capable transmitter of the camera unit, and optionally other components, in a power off state except when activated by a user or by a predetermined alert event.

A significant benefit provided by the systems, devices, and methods disclosed herein is a substantial improvement in camera unit maintenance-free battery life provided thereby. After installation, it is desirable for a camera unit to function reliably for an extended period of time without a need for any battery maintenance, such as, for example battery replacement or battery charging. Battery replacement may entail significant inconvenience, such as, for example, removing the camera unit from its installed location, opening the unit, removing batteries, disposing of used batteries, obtaining new batteries, installing the new batteries, closing the unit, and replacing it in its installed location. In embodiments, a camera unit may be provided with battery charging circuitry and/or a USB connector or other suitable connector for supplying charging power, such as from an external charger, or could be provided with components for wireless charging. Considerable potential inconvenience would nevertheless remain, since it may still be necessary to remove the camera unit from its installed location and move it to a location accessible to charging power, leave the unit charging for the necessary period of time, during which camera coverage of the installed location is unavailable, and remember to replace the unit to its installed location after charging is complete. Accordingly, in some embodiments, a camera unit as disclosed herein may provide a maintenance-free battery life, during which the batteries continue to power the unit in a manner adequate to maintain functionality, without any battery replacement or charging, while the camera unit is undergoing normal usage with continuous monitoring for activation signals and an average of five minutes per day of video transmission, of at least about 6 months, or at least about 9 months, or at least about 12 months, or at least about 15 months, or at least about 18 months, or at least about 21 months, or at least about 24 months. In some embodiments this maintenance-free battery life may be provided in a camera unit having a self-contained power source of or equivalent to 1 AA battery, or 2 AA batteries, or 3 AA batteries, or 4 AA batteries, or 6 AA batteries. In some embodiments, a camera unit as disclosed herein may provide a maintenance-free battery life on a self-contained power source of about 100,000 mWh or less, or about 75,000 mWh or less, or about 50,000 mWh or less, or about 30,000 mWh or less, or about 20,000 mWh or less, or about 15,000 mWh or less, or about 10,000 mWh or less, during which the batteries continue to power the unit in a manner adequate to maintain functionality, without any battery replacement or charging, while the camera unit is undergoing normal usage with continuous monitoring for activation signals and an average of five minutes per day of video transmission, of at least about 6 months, or at least about 9 months, or at least about 12 months, or at least about 15 months, or at least about 18 months, or at least about 21 months, or at least about 24 months.

An important contributor to the significant improvement in battery life is the considerable reduction in transmitter power drain achieved by maintaining the high-definition video-capable transmitter in a controllable power off state. Currently existing optimally power-conserving video camera units for smart home systems employ a Wi-Fi transmitter having a lower power standby mode for power conservation. A power consumption figure of merit may be computed as the ratio by which the power consumption of a camera unit as disclosed herein is exceeded by the power consumption of an otherwise identical Wi-Fi-only camera unit, each unit being evaluated in its power-conserving standby mode. Thus, in embodiments, a camera unit according to the disclosure hereof may have a power consumption figure of merit of at least about 1.5:1, or at least about 2:1, or at least about 2.5:1, or at least about 3:1, or at least about 3.5:1, or at least about 4:1. In embodiments, the power consumption of a camera unit as disclosed herein, and the consequent power drain on the self-contained power source, may be less than about 100 uA, or less than about 150 uA, or less than about 200 uA, or less than about 250 uA, or less than about 300 uA.

In embodiments, a video subsystem of a smart home system may include one or more smart home peripheral devices, each of which may include a wireless receiver operable on a BLE or other low energy wireless protocol, a controller for detecting an instruction signal received by the wireless receiver, and a functional unit controllable by the controller to perform a function in response to an instruction signal received via the wireless receiver. In embodiments, a functional unit could include any device, component, structure, circuitry, or combination thereof for controlling, monitoring, and/or interacting with a smart home ecosystem or any aspect thereof. In some embodiments, functional units may include modules, actuators, controls, sensors and/or other components adapted and configured to engage with existing user controllable fixtures present in a home, office, or other environment of interest, and to interact with the existing user controllable fixtures so as to operate and/or control them, thereby in turn controlling and/or operating one or more appliances and/or devices that interface with the existing user controllable fixtures. In embodiments, the user controllable fixtures may include any of the many components and/or fixtures commonly found in a home, office, or other environment, such as, for example, light switches, light dimmers, rheostats, electrical receptacles, motor controls, thermostats, heating, cooling, and/or ventilation controls, intrusion, fire and/or other alarm controls, irrigation and/or sprinkler controls, drape, window, and/or shutter controls, door and window locks, and appliance controls. In embodiments, the instruction signal may be transmitted to the peripheral device by a dispatch unit. Thus in embodiments, a smart home system may include a dispatch unit, camera unit, and at least one additional peripheral unit, making up a smart home ecosystem under command and control via BLE from a dispatch unit, with Wi-Fi on demand when activated by control from the dispatch unit, and otherwise in a power off state.

In embodiments, the components of a dispatch unit, camera unit, peripheral device, and/or other component of a smart home system or video subsystem, may be assembled and/or constructed in any manner and using any additional components and/or fabrication technology found advantageous for an application of interest. In some typical embodiments, by way of example only, a functional module or other component and its related circuitry could be disposed on a printed circuit board mounted in a housing. A functional module, transceiver, power source, and/or other component(s) could be implemented as circuitry on the same printed circuit board, or as separate modules mounted thereto or connected therewith in any operable manner. In some embodiments component(s) may be implemented in whole or part as integrated circuits. In some embodiments two or more components may be integrated in a single module or apparatus, optionally with sharing of some elements, in any manner operable for the intended functionality; for example, two or more components could be integrated in a single module or component using a shared power source.

Example 1

Figure 6:
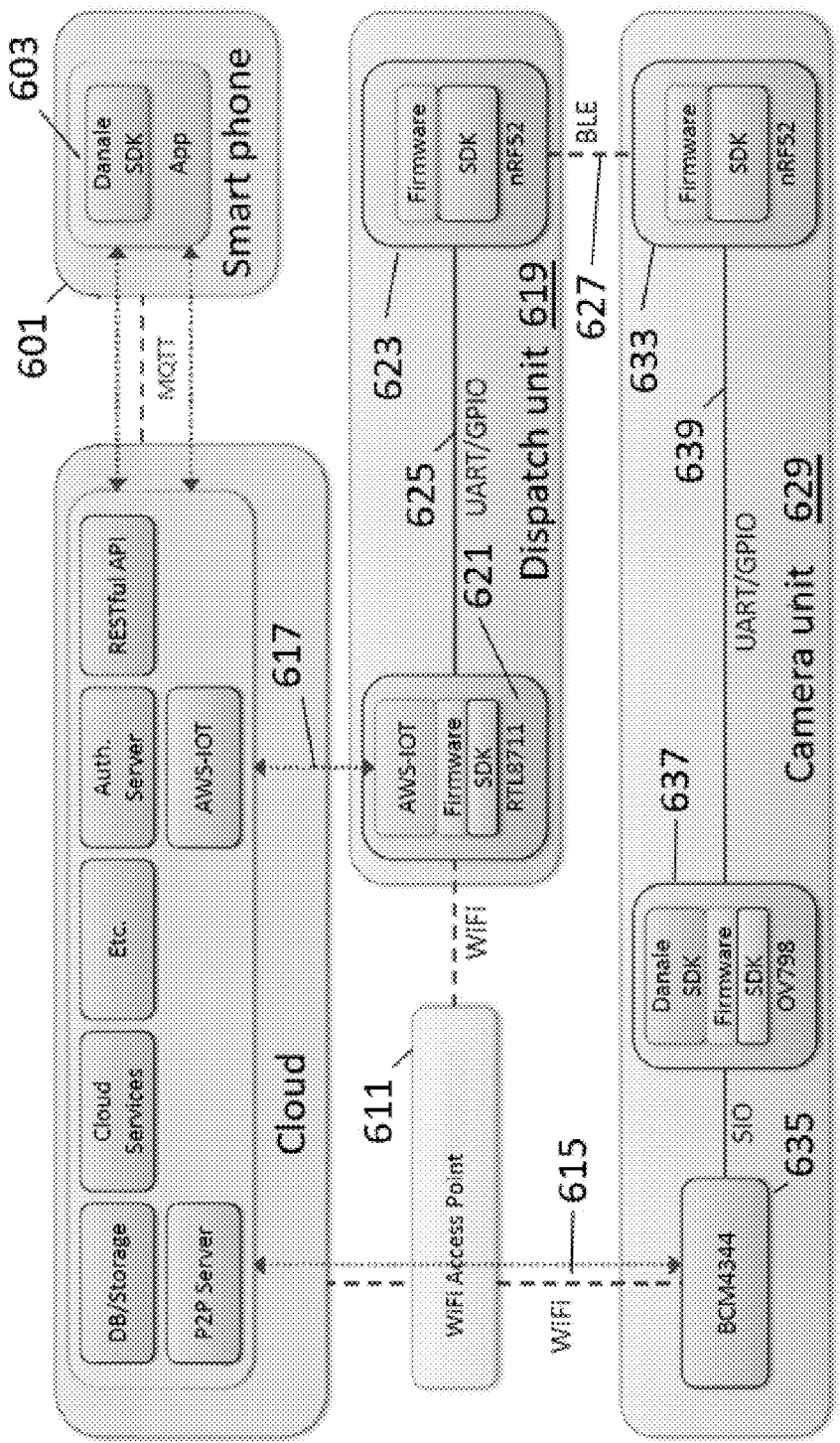
FIG. 6 depicts schematically an embodiment of a video subsystem of a home automation system and other components.

A video subsystem of a smart home system according to the disclosure hereof was implemented according to a design depicted in FIG. 6. A dispatch unit 619 was constructed having a BLE transceiver 623 implemented with the Nordic nRF52 chipset and associated software and firmware. The BLE module interfaces 625 via UART/GPIO with a Wi-Fi transceiver 621 implemented with a Realtek RTL8711 module and associated software and firmware. A camera unit 629 was constructed having a BLE transceiver 633 implemented with the Nordic nRF52 chipset and associated software and firmware. The BLE module interfaces 639 with an OmniVision OV798 camera video processor 637 with associated software and firmware, receiving video input from an OmniVision OV2732 camera sensor (not shown). Video output is communicated to a BroadCom BCM4344 based Wi-Fi transceiver module 635, which is maintained in a default power off state except during transmission, for transmission 615 to a Wi-Fi access point or router 611. Thus a device such as a smart phone 601 provided with an application 603 according to the disclosure hereof may initiate transmission of an activation request 617 to the dispatch unit, which may then transmit an activation signal 627 to the BLE receiver of the camera unit, activating the camera unit and upon completion of the transmission the Wi-Fi transceiver module is returned to its default power off state.

Component level and total power consumption and comparison with a leading commercially available Wi-Fi-only camera unit using an awake-on-timed-intervals monitoring strategy, and each in a standby/monitoring configuration, is shown in Table I.

TABLE I

Power consumption comparison

| Component | Camera Unit per disclosure hereof | Wi-Fi-only-Camera Unit | Unit |
|---|---|---|---|
| PCBA | 60 | 58 | uA |
| CPU/TI | 0 | 90 | uA |
| PIR | 16 | 40 | uA |
| Nordic Chip | 64 | 0 | uA |
| Wi-Fi Chip | 0 | 350 | uA |
| Total | 140 | 538 | uA |

A power consumption figure of merit is computed as the ratio of 480 uA to 140 uA, or 3.42. Table II shows a calculation of power consumption and battery life based on the foregoing. The battery life is reduced from the figure shown depending on the amount of time during which Wi-Fi and video module are activated.

TABLE II

| Battery life | | |
|---|---|---|
| Total Current | 140 | uA |
| Watt-Hours | 27000 | mWH |
| Watt | 0.635 | mW |
| Hours | 42488 | hours |
| Days | 1770 | days |
| Years | 4.85 | years |

The design battery life of the device on 6 AA batteries is two years under normal usage of continuous BLE monitoring and up to five minutes per day of Wi-Fi video transmission.
Interoperation with Other Smart Home Devices In embodiments, in a method of using smart home system including a video subsystem as illustrated generally in FIG. 1 in an exemplary use case, an alert signal could be transmitted from a camera 117, wide view security camera with smoke detection 109, or other device (which could be battery powered) via a low-power-demand communications channel such as, for example, a Bluetooth or BLE connection, and relayed directly or via other connected devices to a device such as a smart phone 105 having a user interface, thereby communicating the alert signal to the user. On receiving the alert signal, or otherwise as desired, the user may operate the smart phone or other user interface device to transmit (or control another connected device such as a coordinating device 101 to transmit) an activation signal to the camera or other device. In some embodiments, signals may be relayed through a repeater or range extender which may be employed to increase the range of distances over which the system can reliably operate. In some embodiments the repeater or range extender and/or dispatch unit could be employed to retransmit a signal in a modality different from the modality in which the signal is received, such as, for example, receiving a signal on a BLE channel and re-transmitting it on a Wi-Fi channel or vice versa. A camera or other device, upon receiving the activation signal, may activate a longer-range and/or higher capacity channel using, for example, a Wi-Fi or WiMAX connection, and transmit data, such as, for example, a video and/or audio stream, which may be received directly by or relayed through other devices to the smart phone or other user interface device. Upon conclusion of the transmission, the connection of the camera or other device to the longer range and/or higher capacity channel may be placed in a quiescent state, which could be a power off state, conserving battery life.

Figure 7:
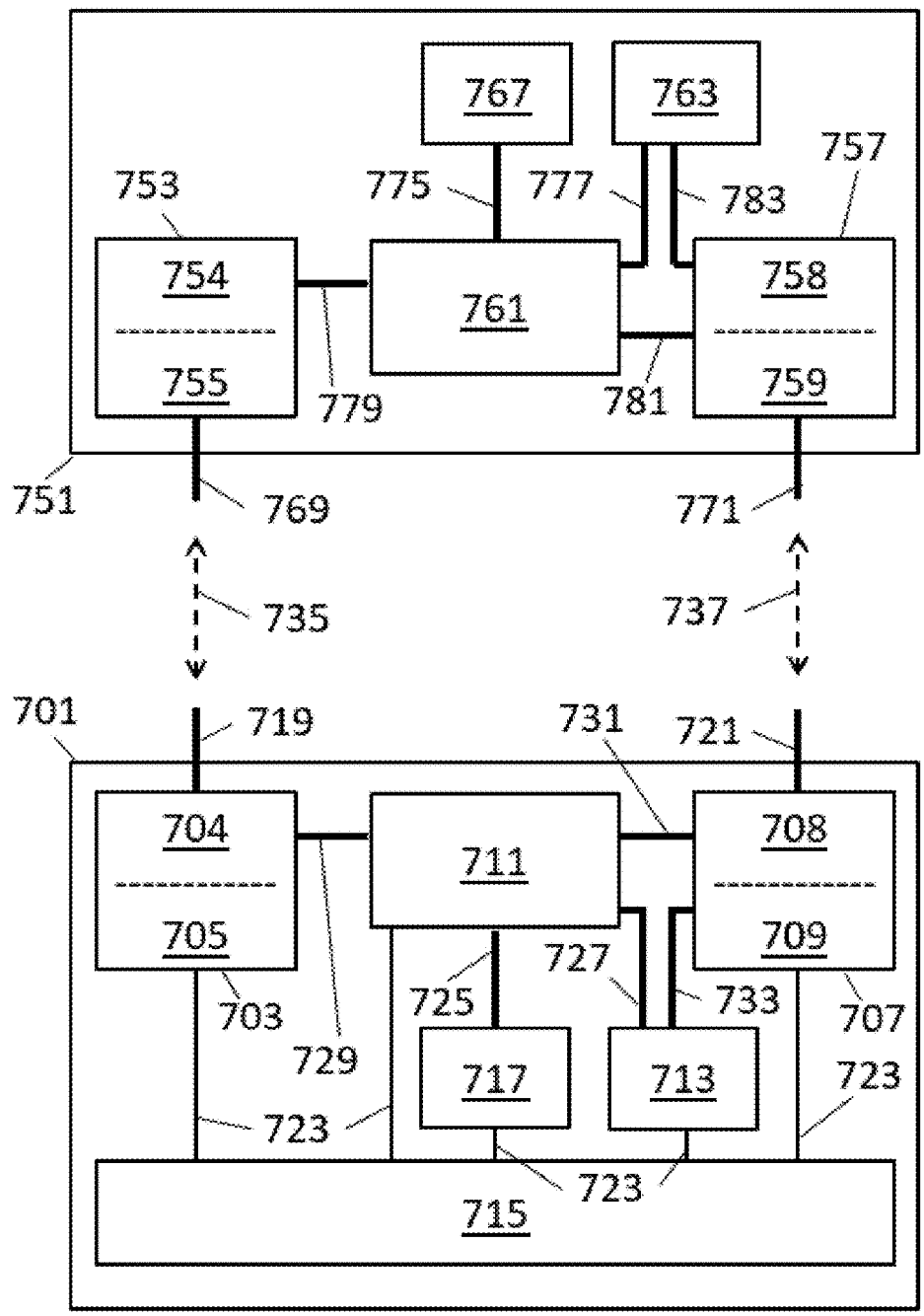
FIG. 7 depicts schematically an embodiment of a system including a first wireless device and a second wireless device consistent with the disclosure hereof.

In some embodiments as depicted schematically in FIG. 7, a smart home system could include a source wireless device 701, which could be a smart home peripheral device, and a second wireless device 751. The source wireless device could include a data source 713, and a first wireless transceiver 707 including a transmitter 709 and optionally a receiver 708. Except when activated as disclosed herein, the first wireless transceiver is in a quiescent state. In the embodiment illustrated, the first wireless transceiver is connected to the data source via a connection 733 operable to convey data from the data source to the transceiver, and the transceiver is adapted and configured to receive data from the data source and connect to and transmit the data over a primary wireless communication channel 737, which could be to a device such as the device 751 depicted, or to any other device compatible for receiving a communication from the transceiver 707, such as, for example, a wireless router. In the embodiment as illustrated, the first wireless device includes a second wireless transceiver 703 including a receiver 704 and optionally a transmitter 705, adapted and configured to connect to a secondary wireless communications channel 735 and receive thereon an activation signal. During normal operation, and/or during determined time periods, the second wireless transceiver monitors the secondary wireless communication channel for activation signals and optionally for other signals of interest. A controller 711 may be provided and operably connected 731 to the first wireless transceiver and/or connected 727 to the data source, to provide control by the controller over the operation of the data source and the provision of data therefrom to the first wireless transceiver. The controller may be connected 729 to the second wireless transceiver 703 and adapted, configured, and/or programmed to respond to the activation signal by controlling the first wireless transceiver to enter an activated state and transmit data from the data source over the primary wireless communication channel. The controller could optionally be connected 725 to a user interface 717 to facilitate programming and/or issuing instructions to the controller or for other purposes. In embodiments, the user interface could include one or more controls or sensors for initiating the transmission of an alert signal via the second wireless transceiver over the secondary wireless communications channel. One or more of the first wireless transceiver, second wireless transceiver, controller, user interface, and data source may be powered by a battery or other self-contained and/or limited capacity power source 715 connected 723 thereto. One or more antenna assemblies 721, 719 may be provided for transmission of signals by the first and second wireless transceivers, respectively. In some embodiments, the first and second wireless transceivers may share one or more antennas or other components and/or may be integrated or combined in a single component. In embodiments as depicted in FIG. 7, the transmitting range and/or data capacity of the first wireless transceiver is greater than the transmitting range and/or data capacity of the second wireless transceiver, and the power demand of the second wireless transceiver is less than the power demand of the first wireless transceiver. Thus, by maintaining the first wireless transceiver in a quiescent state except when activated by an activation signal transmitted over the secondary wireless communication channel power consumption and consequently battery life may be conserved. After transmission of data, the first wireless transceiver may be returned to a quiescent state automatically, under the control of the controller and/or in response to a deactivation signal received over either of the wireless communication channels or in response to user input. The quiescent state may include any state operable to reduce the power demand of the primary wireless communication channel and/or transceiver or other components associated therewith, such as, for example, a power off state, a sleep state, a low-power state, or a disconnected state.

In some embodiments as depicted schematically in FIG. 7, there may be provided a master wireless device 751, including a first wireless transceiver 757 including a receiver 758 and optionally a transmitter 759 adapted and configured to connect to a primary wireless communications channel 737 on which a source wireless device 701 is adapted and configured to transmit data on receipt of an activation signal. The wireless device 751 may include a second wireless transceiver 753 including a transmitter 755 and optionally a receiver 754 operatively connected 779 to a controller 761 adapted and configured to control the transmitter 755 to transmit an activation signal over a secondary wireless communications channel 735. Transmission of an activation signal could be initiated in response to user input to a user interface 767, and/or in response to an alert signal, and/or programmatically, as may be found useful for an application of interest. Data received by the first wireless transceiver may be conveyed via a connection 783 to a component 763 adapted and configured to consume the data, such as, for example, a memory or other data store, a processor or computer, or other component adapted for an application of interest, which may include and/or be operatively connected to an output or display such as, for example, a video display, an audio transducer, or an interface component such as, for example, a Universal Serial Bus (USB) controller. The wireless device 751 may include one or more antennas 771, 769 to facilitate operation of the first and second wireless transceivers, respectively, and could be powered by a power source such as a battery or power supply and/or by line power. The components of the source device and/or master device may be connected in any arrangement found useful for an application of interest, using any connection modality operable to conduct or convey the desired signal, such as, for example, the arrangement depicted in FIG. 7 wherein the connections 723, 725, 727, 729, 731 between indicated components in the device 701 and the connections 779, 781, 775, 777, 783 in the device 751 could include simple conductors such as wires or printed circuit conductive paths, or could include active connections such as, for example, interfacing between components via suitable interface circuits or components.

In embodiments of a system and/or a source wireless device 701 as depicted in FIG. 7, a data source such as, for example, the data source 713 as depicted in FIG. 7 may include any device or component or combination thereof operable to produce data found useful for an application of interest, such as, for example, a camera, a microphone, a motion sensor, and/or a computer, processor, and/or memory device. In embodiments, a data source may provide data for transmission over a primary wireless communication channel in real time, or data may be stored and/or accumulated for later transmission, or data may be stored and transmitted in bursts, or provided any other manner found useful for an application of interest. In embodiments, a data source may operate to obtain and relay data from one or more other wireless devices.

In embodiments such as depicted in FIG. 7, a primary wireless communication channel could be implemented in any manner using any devices or components operable to provide a desired level of performance. In some embodiments, a performance requirement of a primary wireless communication channel may be bandwidth and/or data capacity sufficient to accommodate data of a particular type, such as, for example, video data of a desired resolution, quality, and/or frame rate, which the secondary wireless communication channel is inadequate to accommodate. In some applications, a performance requirement of a primary wireless communication channel may be wireless transmission over a distance exceeding the transmission range of which the secondary wireless communication channel is capable. In embodiments, a secondary wireless communication channel may be implemented in a manner using any devices or components operable to monitor the channel for an activation signal while keeping power consumption below a predetermined threshold, or consistent with a predetermined battery life requirement.

Figure 8:
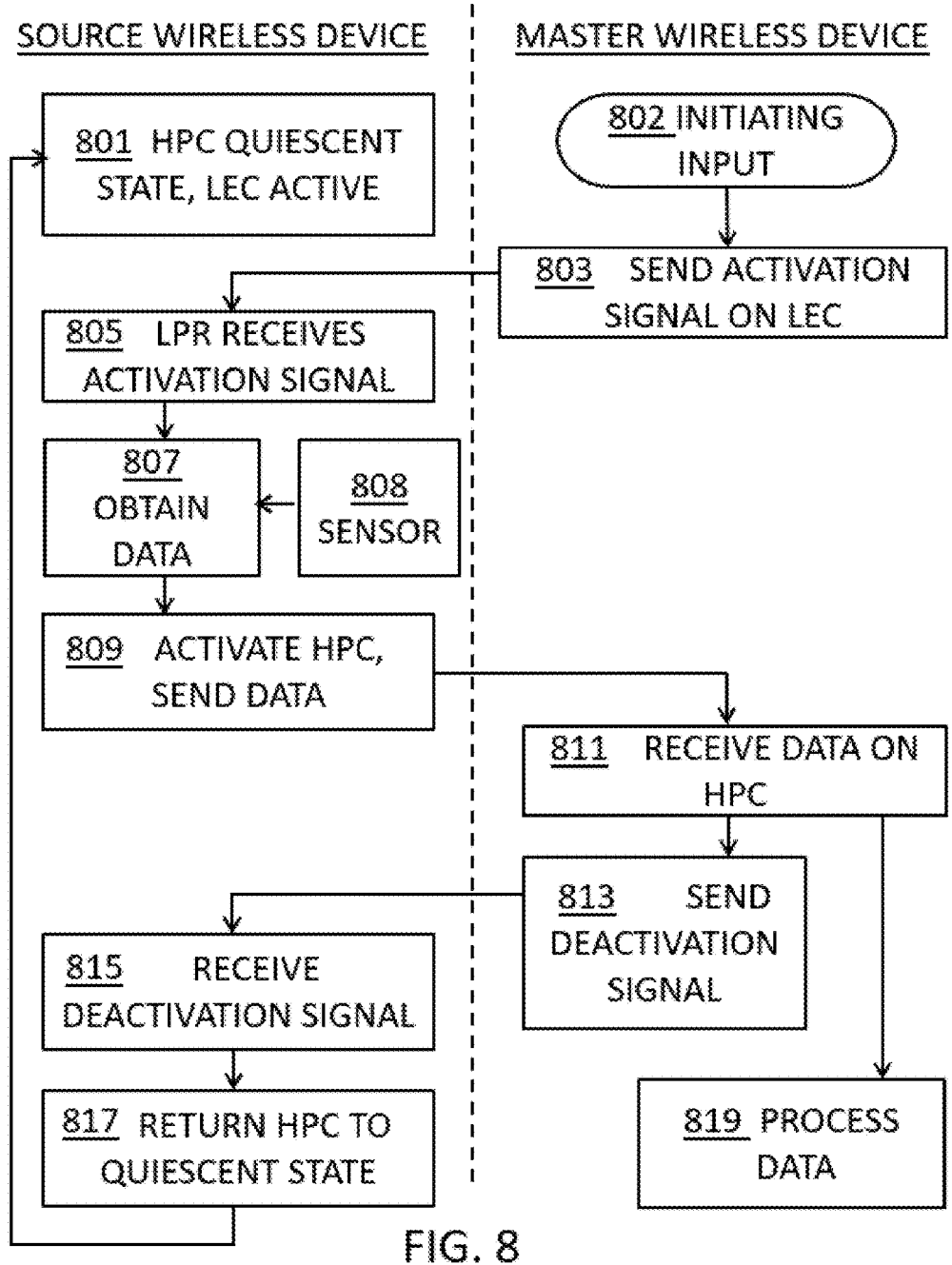
FIG. 8 depicts schematically an embodiment of a method of operating an embodiment of a system including a first wireless device and a second wireless device consistent with the disclosure hereof.

The general outlines of a method of operating an example embodiment of a system including a master wireless device and source wireless device according to an example use case are depicted schematically in FIG. 8. In an initial state 801 of the source wireless device, a high performance wireless communication channel (HPC) of the source wireless device is in a quiescent state, and a low-power wireless communication channel (LPC) of the source wireless device in a monitoring state listening for an activation signal. In response to an initiating input 802, the master wireless device transmits 803 an activation signal over the low-power channel which is received 805 by the low power receiver (LPR) of the source wireless device. The initiating input could be any input found useful for an application of interest; for example, in a wireless doorbell camera, the initiating input could include a command by a user, or a doorbell button press, or detection of motion by a motion sensor. In some embodiments and/or under some conditions, the source device may activate the high performance channel directly, such as, for example, in the case of a doorbell camera where a doorbell button press could directly activate the HPC. The source wireless device is then controlled to obtain data 807 from a sensor 808 or other data source. The source wireless device is then controlled to activate 809 and/or connect to the high-performance channel (HPC) and transmit the data thereon. The transmitted data could be received 811 via the high-performance channel by the master wireless device, or could be transmitted directly to another device compatible with the high performance transmitter of the source wireless device, such as, for example, a wireless router or a user's smart phone. Data received by the master wireless device could be displayed, stored, retransmitted, or otherwise processed 819 by the master wireless device. On completion of the transmission of data from the source wireless device, the master wireless device may optionally send 813 a deactivation signal to the source wireless device which could be over either the high-performance channel (HPC) or the low-power channel (LPC). Upon receiving 815 the deactivation signal, or optionally after a predetermined delay period or in response to program instructions, the high-performance channel of the source wireless device is returned 817 to a quiescent state 801 with the low-power channel remaining in a monitoring state.

In some embodiments, the range of a low power channel, such as, for example, a BLE channel, may be extended by providing an amplifier to amplify the transceiver, by utilizing MESH technology where one or more other devices in the system acts as a repeater, by including in the system one or more bridges (such as, for example, a Wi-Fi BLE bridge that acts as a repeater and/or range extender and also may convert BLE signals to Wi-Fi for outbound communication to the cloud and vice versa for inbound communications from the cloud), or by any combination of any of the foregoing. In some embodiments all of the foregoing strategies are employed together thereby providing triple redundancy. In some embodiments, a Wi-Fi BLE bridge may not include hub functionality, and/or may be limited to bridge and/or range extender functionality. In some embodiments, a high capacity channel, such as, for example, a Wi-Fi channel for transmitting video and/or audio from a camera or other source device, is configured to transmit from the source device to a router, such as, for example, a Wi-Fi router, thereby avoiding latency caused by routing the high capacity channel through a hub and thereby significantly improving responsiveness. In some embodiments, a source device may communicate directly to the cloud, such as, for example, via hub software and/or circuitry incorporated or integrated into the source device, thereby eliminating the need for communication through a separate hub device. Thus in some embodiments, hub functionality may be incorporated into the camera or other source device itself, thereby eliminating the need for a hub and allowing for direct streaming to the home router or access point and drastically reducing latency. In some embodiments a source device such as, for example, a camera, may communicate data directly to a router and optionally from thence to the cloud. In some embodiments, by employing an on demand high capacity channel activated by a low power channel, battery life of a wireless device such as a camera may be improved in comparison to a device lacking this innovation by at least 3 months, or 6 months, or 1 year, or 1.5 years, or 2 years, or 2.5 years, or 3 years, and battery consumption may be reduced by at least approximately 50%, or 60%, or 70%, or 80%, or 90%, or 95%.

In some embodiments, automation devices and/or smart home peripheral devices may be adapted and configured to be installed in physical engagement with user controllable fixtures already present in the environment of interest, and to control and/or operate the existing user controllable fixtures by physical manipulation thereof. In some embodiments, any of such peripheral devices may be adapted and configured to respond to control signals received from a dispatch unit via BLE wireless transmissions and perform a function and/or activate a functional unit in response thereto. In some embodiments, the automation devices are adapted and configured to interface physically with the existing user controllable fixtures and control and/or operate the existing user controllable fixtures without the necessity of any modification to or disassembly of the latter. In some embodiments, an automation device and/or smart home peripheral device may be provided with one or more user controls for use in controlling and/or operating the automation device and thereby in turn controlling and/or operating an existing user controllable fixture with which the automation device is associated and/or interfaced. In embodiments, user controls may include any of the many components and devices used for controlling electrical, electronic, and/or electromechanical devices, such as, for example, buttons, levers, switches, dials, sliders, touch screens, and keypads, and may be disposed in or on the automation device and/or may operate an automation device remotely such as, for example, in response to one or more signals from a remote control, remote keypad, console, computer, or cellular phone.

In embodiments, a smart home peripheral device may employ a self-affixing attachment, which may include any attachment modality operable to establish an engagement between the smart home peripheral device and a controllable fixture having adequate strength upon placing the smart home peripheral device in position and optionally applying pressure, making minor positional adjustments to the smart home peripheral device or a part or component thereof, or otherwise securing the smart home peripheral device in position without the use of tools and without modifying, removing, or disassembling the controllable fixture or any part thereof. In embodiments, self-affixing attachments may include one or more self-affixing fasteners, such as, for example, hook and loop fasteners, magnets, adhesive strips, micro suction cup pads, silicone adhesive pads, double-sided adhesive tape, 3M command tape, spring clips, gripper clips, adhesive or sticky clay, adhesive backings, and/or liquid or gel adhesives. In embodiments, self-affixing fasteners of more than one type may be employed in combination. In embodiments of smart home peripheral devices, it may be found useful to employ attachments that are releasable, which may include any attachment whereby the smart home peripheral device is removable from its engagement with the controllable fixture by application of outward and/or transverse pressure alone, or by application of outward and/or transverse pressure accompanied by release of one or more spring clips or gripper clips if present, and whereby the normal operability of the existing controllable fixture is restored by such removal. In embodiments, releasable attachments could be implemented by the use of releasable fasteners, such as, for example, hook and loop fasteners, magnets, micro suction cup pads, and spring clips as well as adhesives such as, for example, silicone adhesive pads, adhesive strips, double-sided adhesive tape, adhesive clay, adhesive backings, and/or liquid or gel adhesives, that are formulated to be releasable and/or non-hard curing. Thus, an example of an embodiment of a smart home peripheral device could include a light switch automation device including a housing having a self-affixing releasable attachment for affixing the housing in position over a light switch; an actuator located within the housing, and configured to actuate a lever of the light switch once the light switch automation device has been placed on the light switch cover plate; and a microcontroller located within the housing and configured to control the actuator; and could include a BLE-compatible receiver for receiving a control signal from a dispatch unit.

Figure 9A:
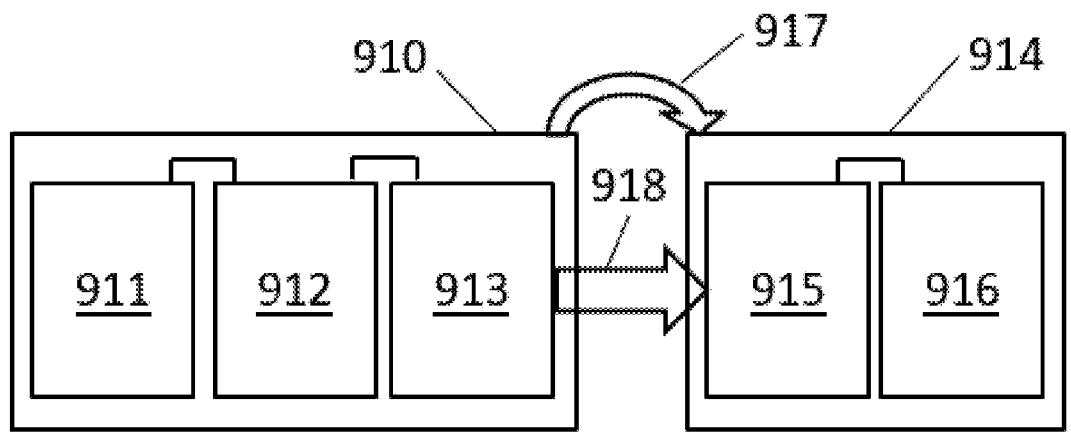
FIG. 9A shows a schematic depiction of a generalized example embodiment of an smart home peripheral device for engagement with a user controllable fixture consistent with the disclosure hereof.

In embodiments, as illustrated schematically in FIG. 9A, in general an automation device 910, which could include a smart home peripheral device, for controlling and/or operating a user controllable fixture 914 may include an actuator 913 adapted and configured to engage with 918 and control and/or operate a physically operable control 915 of the user controllable fixture. The actuator may be coupled to and/or under the control of a controller 912, which may be coupled to and/or in communication with an interface 911 from which the controller may receive instructions. The physically operable control of the user controllable fixture may be coupled to and/or control a functional component 916 of the user controllable fixture or of another device or fixture. The automation device may be installed and/or affixed to the user controllable fixture by a self-affixing attachment 917, which may include any attachment modality allowing for installation of an automation device in engagement with a user controllable fixture solely by placing the automation device in position and optionally applying pressure, making minor positional adjustments to the automation device or a part or component thereof, and/or otherwise securing the automation device in position without need for the use of tools and without modifying, removing, or disassembling the user controllable fixture or any part thereof.

Figure 9B:
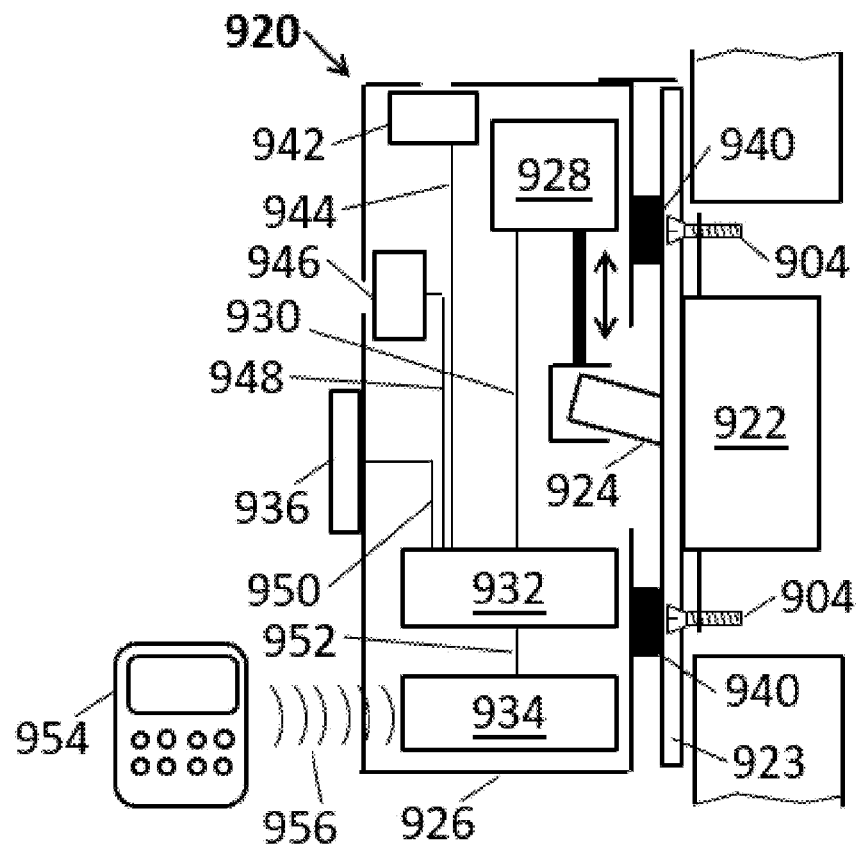
FIG. 9B shows a schematic depiction of an embodiment of a switch automation device consistent with the disclosure hereof, in engagement with a toggle-type switch.

In embodiments of an automation device 920 for operating an existing switch, such as, for example, a light switch, as depicted schematically in FIG. 9B, an automation device may be adapted and configured to physically engage and operate an existing switch fixture 922 having a switch lever 924 and cover plate 923. In embodiments, the automation device may include a housing 926, at least one self-affixing attachment 940 for holding the housing in position and alignment with the switch and/or cover plate, an actuator 928 located within the housing and configured to actuate a lever 924 of the light switch once the light switch automation device has been installed over the light switch and cover plate, and a controller 932 in communication 930 with the actuator and configured to control the actuator to actuate the lever of the light switch in response to a signal. In some embodiments, a controller 932 may be configured to respond to any inputs and/or signals deemed useful for an application of interest, such as, for example, any one or more of a signal electrically communicated 950 from a button or other user control 936 incorporated into the automation device, a signal communicated wirelessly 956 from a remote device 954, such as, for example, a smart phone or a dispatch unit as disclosed herein, to a receiver 934 in communication 952 with the controller, a signal communicated 948 to the controller from a motion sensor 946, and/or a signal communicated 944 to the controller from a light sensor 942. In embodiments, an automation device may be provided with additional sensors and/or communication components for any useful purpose, such as, for example one or more sensors, transmitters, and/or local or remote user interfaces or displays to provide communication of device status to a user and/or to a remote system for controlling one or more devices. In some embodiments, a self-affixing attachment could include a magnet for providing magnetic attachment to a metal cover plate screw 904 of an existing light switch.

In embodiments, a smart home system could include an automation device, which could include a smart home peripheral device, for installation on and/or controlling an electric receptacle and/or a device receiving power from an electric receptacle. Again, in embodiments, the device could include a receiver and control circuitry for responding to control signals transmitted to the device by a BLE transmission from a dispatch unit. In embodiments as illustrated schematically in FIG. 10, there is provided an automation device 1000 for installation over an existing electrical receptacle 1001, the automation device including a housing 1015, a plurality of electrically conductive male prongs 1005 extending outward from the housing and disposed in an arrangement compatible for insertion into a plurality of plug recesses of the electrical receptacle so as to make electrical contact with the electrical contacts 1003 of the receptacle; at least one female electrical receptacle subassembly 1006 comprising a plurality of conductive contacts 1013 disposed in recesses in an arrangement compatible with a male electrical plug; a regulator 1007 adapted to regulate an electrical connection 1014 between at least one of the electrically conductive male prongs and at least one of the conductive contacts; and a controller 1008 communicating 1018 with the regulator and adapted and configured to control the regulator in response to a signal and/or according to a program or logic. The automation device may be installed on the electrical receptacle by inserting the male prongs of the automation device into the female plug recesses of the electrical receptacle. As with other embodiments of automation devices disclosed herein, in some embodiments, the automation device may be secured in whole or part to the electric receptacle or a cover plate 1002 thereof by a self-affixing attachment, which may, in embodiments, be implemented in whole or part by one or more self-affixing fasteners and/or one or more releasable fasteners.

In some embodiments, an electrical receptacle has a cover plate 1002 secured by one or more ferrous metal screws 1016, and the housing 1015 of an automation device may be provided with rear-facing magnetic material 1009 in at least one location corresponding to a cover plate screw 1016; the attractive force of the rear-facing magnetic material toward the screw head of the cover plate screw of the electrical receptacle improves the stability of the installation, a particularly useful feature in installations where, as often occurs, the contacts of the existing electrical receptacle are bent, worn, or otherwise not in optimal condition for gripping the male prongs of the automation device, resulting in a tendency for male plugs to dislodge or fall out of the receptacle. In an embodiment, it is not necessary that all of the male prongs be conductive or be connected to the regulator; since all that is required is a power source and assuming both or all receptacle subunits are supplied from the same power source, for all but one male subassembly plastic or other nonconductive and/or non-connected prongs may be substituted, thereby reducing the cost of the device, and reducing unnecessary internal complexity.

In an example embodiment of an electric receptacle automation device, the female electrical receptacle subassembly 1006 is adapted and configured to receive a male electrical plug, which may include any of the many male electrical plug configurations compatible with home, office or other electrical systems; in embodiments, it may be found preferable to employ a female electrical receptacle subassembly configuration compatible with a male electrical plug configuration of a type commonly used in and compliant with relevant electrical codes of the country and region where the device is intended to be used.

Figure 11:
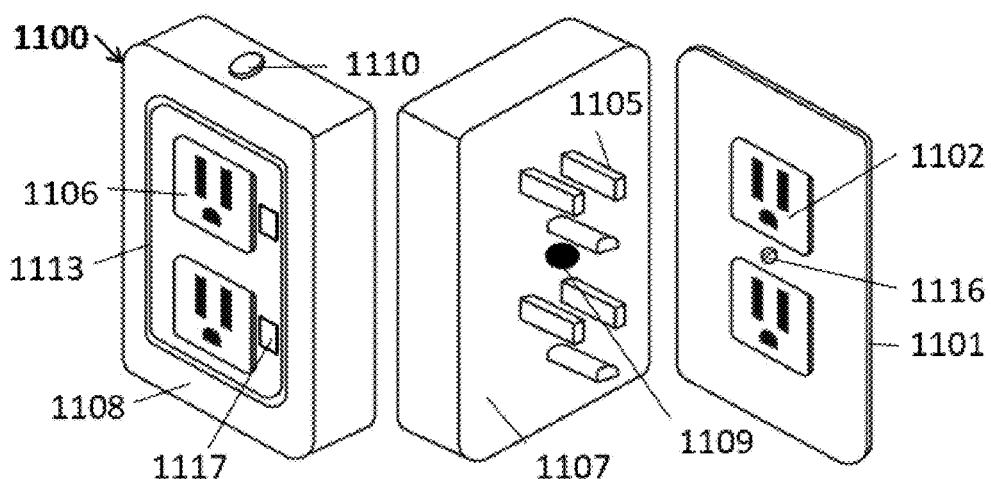
FIG. 11 depicts an embodiment of a smart home peripheral device consistent with the disclosure hereof, adapted and configured for installation over an electric receptacle.

FIG. 11 illustrates an example embodiment 1100 showing a typical physical layout and form factor. The male prongs of the device 1105 are configured to plug into an existing receptacle fixture 1102 which may have a cover plate 1101 secured by a metallic screw 1116. The male prongs extend outward from the back portion 1107 of the housing of the device (that is, the portion adjacent to the existing receptacle fixture when the device is installed onto the fixture), and optionally a magnetic material 1109 may be disposed in a position for alignment with the cover plate screw 1116 of the receptacle fixture. The female electrical receptacle subassemblies 1106 of the device are accessible in the front portion 1108 of the device (that is, the portion facing outward when the device is installed over a fixture). Optionally, as with other automation devices and embodiments thereof disclosed herein, a luminescent strip 1113 may be provided to improve the visibility of the device under low light conditions, and a motion, ambient light, or other sensor 1110 may be incorporated. In embodiments, a device may incorporate user controls, such as, for example, a button 1117 for individually activating and/or deactivating a female electrical receptacle subassembly.

Figure 10:
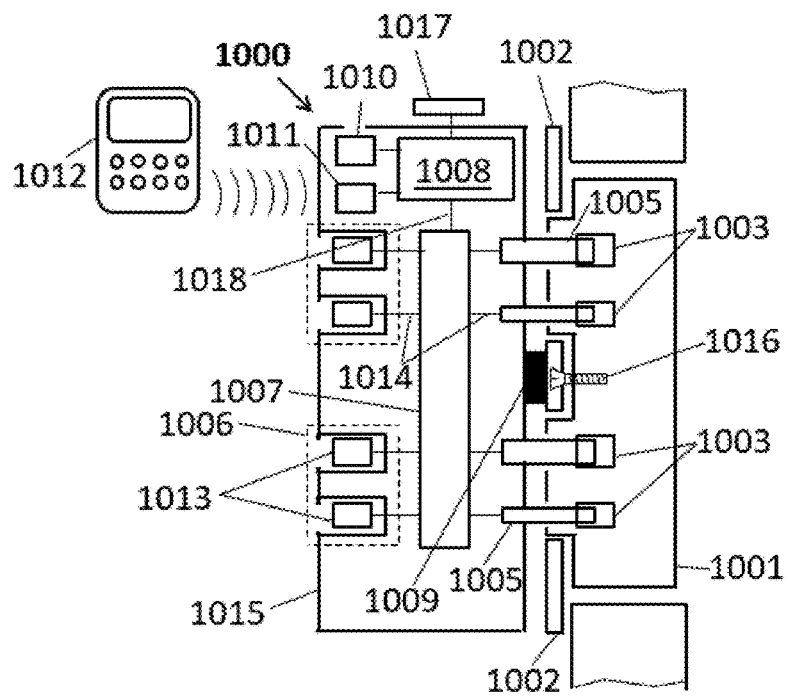
FIG. 10 depicts schematically an embodiment of a smart home peripheral device consistent with the disclosure hereof, adapted and configured for installation over an electric receptacle.

In some embodiments as illustrated in FIG. 10, an electric receptacle automation device may be provided with a regulator 1007, for regulating a connection 1014 between the contacts 1003 of the receptacle and the contacts 1013 of the female electrical receptacle subassembly. The regulator may control, regulate, and/or modify the electrical current and/or potential delivered by the receptacle in any manner found useful for an application of interest, and may do so using any of the many components and circuits familiar to persons of skill in the art of electrical and electronic engineering and design. By way of example, in embodiments, the regulation of the connection may be passive, such as by a switch or relay to make or break the connection, thereby delivering or disconnecting the current and/or potential of the receptacle to the female electrical receptacle subassembly and thereby, for example, controlling an appliance plugged into the female electrical receptacle subassembly to an "on" or "off" state. In some embodiments, the regulator may operate to deliver to the female electrical receptacle subassembly current and/or potential differing from that present at the contacts of the receptacle, such as, for example, by providing for controllably reduced potential at the female electrical receptacle subassembly, thereby providing "dimmer" type functionality, or by altering the frequency and/or waveform of the delivered current so as to provide motor speed control functionality, or by filtering the delivered current to remove spikes or noise.

In embodiments, an electrical receptacle automation device may include a controller 1008 in communication via a communication channel 1018 with a regulator 1007, the controller being adapted and configured to control the operation of the regulator. As with other automation devices as disclosed herein, a controller of a receptacle automation device may, in some embodiments, be configured to respond to any inputs and/or signals deemed useful for an application of interest, such as, for example, any one or more of a signal electrically communicated from one or more buttons or other user controls 1017 incorporated into the automation device, a signal communicated wirelessly from a remote device 1012 to a receiver 1011 in communication with the controller, a signal communicated to the controller from a sensor 1010 such as a motion sensor or light sensor, and/or a signal communicated to the controller from a dispatch unit. In embodiments, an automation device may be provided with additional sensors and/or communication components for any useful purpose, such as, for example one or more sensors, transmitters, and/or local or remote user interfaces or displays to provide communication of device status to a user and/or to a remote system for controlling one or more devices. As with other automation devices as disclosed herein, in embodiments, optionally there may also be provided one or more wireless devices for communicating with other automation devices and/or with a central controller and/or one or more user interface devices.

Thus in various embodiments, as with any of the automation devices disclosed herein, a receptacle automation device may include a Bluetooth, BLE, or other wireless transceiver and one or more sensors such as a motion sensor and/or light sensor, the controller of the device being programmed and/or embodying logic to perform functions such as, for example, triggering another automation device, or sensing motion and/or sensing an ambient light level and in response thereto turning on a night light or other illumination component that may be included as part of the device. In some embodiments, an automation device may include a proximity sensor in communication with the controller and/or wireless transceiver, thereby providing functionality such as notifying the system and/or a controller thereof or related device or system (such as an intrusion alarm system) of the presence of a person, pet, or other entity detectable by the proximity detector. In some embodiments, an automation device and/or smart home peripheral device may include one or more environmental sensors, such as, for example temperature sensors and/or humidity sensors, and be configured to communicate environmental data to other automation devices, and/or a central system and/or controller, and/or other systems such as HVAC and/or humidifier systems. In some embodiments, an automation device and/or smart home peripheral device may include one or more sound sensors, thereby enabling functionality such as, for example, communicating with a sound or entertainment system to regulate sound volume levels, and/or may incorporate sound sensors coupled with voice recognition functionality, thereby enabling voice control of the automation devices and/or other devices or systems in communication with the automation device. In embodiments, an automation device and/or smart home peripheral device according to the disclosure hereof may, in addition to or in lieu of its local function of controlling a light switch, receptacle, or other fixture, also function as a "sensor platform" for communicating with, controlling, and/or reporting and/or processing status information to or from one or more other automation devices or control, interface, or reporting devices.

In embodiments, a smart home peripheral device for controlling an electrical receptacle and/or device receiving power therefrom such as depicted in FIG. 10 and/or FIG. 11 could be combined and/or integrated with a dispatch unit as disclosed herein, thereby facilitating convenient installation of the dispatch unit and providing the dispatch unit with a ready source of power, while also providing controllable receptacle functionality.

Other Embodiments

In embodiments, there is provided a video subsystem for a system such as, for example, a smart home system, including an internet connection accessible via a wireless internet access point, the subsystem including a dispatch unit including a wireless receiver operable on a wireless protocol compatible for communication with the wireless internet access point, a wireless transmitter operable on a low energy wireless protocol such as, for example, BLE, and an interface for operating the wireless transmitter to transmit an activation signal via the low energy wireless protocol in response to an activation request received by the wireless receiver; and a wire-free camera unit, including a wireless receiver operable on the low energy wireless protocol, a camera sensor module, a self-contained power source, a wireless data transmitter operable on a high-definition video-capable wireless protocol, such as, for example, Wi-Fi, and controllable to either of a default power-off state or an operating state, and a controller to, in response to an activation signal received via the wireless receiver, control the wireless transmitter to an operating state and operate the camera sensor and wireless transmitter to transmit a high-definition video transmission and thereafter return the wireless transmitter to its default power-off state.

In embodiments of a video subsystem, transmitting a high-definition video transmission may include transmitting the high-definition video transmission directly to the wireless internet access point and/or to a user's smart phone without relaying through any other device.

In embodiments of a video subsystem wherein a self-contained power source includes at least one battery, the maintenance free battery life of the camera unit may be at least 18 months in normal usage with continuous monitoring for activation signals and video transmission averaging 5 minutes per day, and/or the power consumption figure of merit of the camera unit may be at least 2:1.

In embodiments of a video subsystem, a low energy wireless protocol could include a protocol selected from a Bluetooth protocol, a Bluetooth Low Energy protocol, a ZigBee protocol, a Passive Wi-Fi protocol, and an Ant protocol.

In embodiments of a video subsystem, the wireless transmitter of a dispatch unit could include a range extender, and/or the range of the wireless transmitter of a dispatch unit could be extended by relaying transmissions over a mesh network. In some embodiments, the operating range of the transmission of an activation signal by a dispatch unit to a camera unit could be at least 43 meters.

An embodiment of a video subsystem could include an alert sensor adapted and configured to detect an event and thereupon communicate an alert signal to the controller of a camera unit, and the controller of a camera unit could be adapted and configured to, upon receiving an alert signal, control a wireless transmitter of the camera unit to an operating state and operate a camera sensor and wireless transmitter of the camera unit to transmit a high-definition video transmission and thereafter return the wireless transmitter and optionally the camera sensor to its default power-off state. In embodiments, an alert sensor could include an event sensor selected from a motion sensor, an infrared sensor, a switch, a doorbell button, a temperature sensor, a smoke detector, an intrusion sensor, a video or camera sensor, and an audio sensor; and/or could be disposed in a separate housing from a camera unit. In embodiments, an alert sensor could be configured to communicate an alert signal by wireless transmission of an alert signal to a camera unit via a low energy wireless protocol.

An embodiment of a video subsystem could include a smart phone application operable, when installed on a smart phone, to receive from a user a command to activate a camera unit, and thereupon relay a control signal to a dispatch unit over a communication channel including an internet access point; and/or to receive from a user a command to activate the camera unit, and thereupon relay a control signal to the dispatch unit via a direct wireless transmission from the smart phone to the dispatch unit; and/or to receive a video signal transmission transmitted by the camera unit and relayed to the smart phone over a communication channel including an internet access point; and/or to receive a video signal transmission transmitted by a camera unit and relayed directly to the smart phone using a high-definition video-capable wireless protocol; and/or any combination of the foregoing functionality.

Embodiments of a video subsystem may include one or more smart home peripheral devices, each of which could include a wireless receiver operable on the low energy wireless protocol, a controller for detecting an instruction signal received by the wireless receiver, and a functional unit controllable by the controller to perform a function in response to an instruction signal received via the wireless receiver.

In some embodiments of a video subsystem, a dispatch unit and a camera unit may be installable and operable with no physical alteration of the installation site. In some embodiments of a video subsystem a high-definition video-capable wireless protocol could include an IEEE 802.11 protocol. In some embodiments of a video subsystem, the wireless transmitter of a camera unit may be operable to transmit continuous video at a frame rate of at least 12 frames per second and a resolution selected from 1080p, 720p, 480p, and 360p. In some embodiments of a video subsystem the average power drain on the self-contained power source of a camera unit may be less than 150 uA when the wireless transmitter of the camera unit is in its default power-off state.

In some embodiments of a video subsystem a dispatch unit may further include a wireless receiver adapted and configured to receive via a low energy wireless protocol, such as, for example, BLE, a message transmitted by a source selected from: a camera unit, a smart home peripheral device, a smart phone, a tablet, and a computer.

In embodiments there may be provided a wire-free camera unit, which may include a wireless receiver operable on a low energy wireless protocol such as, for example, BLE, a camera sensor module, a self-contained power source, a wireless transmitter operable on a high-definition video-capable wireless protocol such as, for example Wi-Fi, and controllable to either of a default power-off state or an operating state, and a controller adapted and configured to monitor the wireless receiver and, in response to an activation signal received via the wireless receiver, control the wireless transmitter to an operating state and operate the camera sensor and wireless transmitter to transmit a high-definition video transmission and thereafter return the wireless transmitter to its default power-off state.

In embodiments there is provided a method of using a wire-free camera unit, the method including: via a wireless receiver, receiving an activation signal; in response thereto, controlling a high performance wireless transmitter to its operating state; controlling the high performance wireless transmitter to transmit a high-definition video transmission; and after completion of the high-definition video transmission, returning the high performance wireless transmitter to its default power-off state.

In embodiments there is provided a smart home peripheral device, which may include a wireless receiver operable on a low energy wireless protocol, such as, for example, BLE; a controller; a functional unit controllable by the controller to perform a function; and a wireless transmitter operable on a high performance wireless protocol and controllable by the controller to either of a default power-off state or an operating state; wherein the controller is adapted and configured to detect an activation signal received by the wireless receiver and after detecting an activation signal control the wireless transmitter to an operating state and operate the wireless transmitter to transmit data via the high performance wireless protocol and thereafter return the wireless transmitter to its default power-off state.

In embodiments, there is provided a method of using a smart home peripheral device, the method including: via a wireless receiver operating on a BLE or other low energy protocol, receiving an activation signal; in response thereto, controlling a high performance wireless transmitter of the peripheral device, such as, for example, a Wi-Fi transmitter, to its operating state; controlling the high performance wireless transmitter to transmit data via Wi-Fi or other high performance wireless protocol; and after completion of the transmission, returning the wireless transmitter to its default power-off state.

In embodiments there is provided a smart home kit which may include a video subsystem according to the disclosure hereof and at least one smart home peripheral device, which could include a light switch automation device including: a housing including a self-affixing releasable attachment for affixing the housing in position over the light switch; an actuator located within the housing, the actuator configured to actuate a lever of the light switch once the light switch automation device has been placed on the light switch cover plate; and a microcontroller located within the housing and configured to control the actuator in response to an activation signal received from a dispatch unit. In some embodiments a smart home peripheral device for inclusion in a smart home kit could include an electrical receptacle automation device for installation over an electrical receptacle by a self-affixing and/or releasable attachment, and including a plurality of electrically conductive male prongs extending outward from the housing and disposed in an arrangement compatible for insertion into a plurality of plug recesses of the electrical receptacle, at least one female electrical receptacle subassembly comprising a plurality of conductive contacts disposed in recesses in an arrangement compatible with a male electrical plug, a regulator adapted to regulate an electrical connection between at least one of the electrically conductive male prongs and at least one of the conductive contacts, and a controller configured to control the regulator in response to a signal received from a dispatch unit. In some embodiments, a dispatch device could be integrated with an electric receptacle automation device.

In embodiments, there is provided a method of controlling a fixture that exposes a physically operable control, the method including: with an automation device including an actuator and affixed by a self-affixing attachment to the fixture in position for engagement by the actuator with the physically operable control of the fixture, receiving a signal, which could be a signal received via a BLE or other low energy transmission from a dispatch unit; and in response thereto controlling the actuator to operate the physically operable control. In embodiments, a signal may be of any type, source, and/or content, such as, for example, from a user input component incorporated in the automation device, an external control device, or a pre-programmed signal originating from a microcontroller or other controller of the device. In embodiments, a signal could be a signal transmitted wirelessly by a dispatch unit according to the disclosure hereof.

In embodiments, there is provided an automation device for engagement with a fixture having a physically operable control, the automation device including an attachment for attaching the automation device to the fixture, an actuator for engaging the physically operable control and performing at least one operation thereon, and a controller configured to communicate with the actuator and control an operation thereof. In embodiments, the components of the automation device may be disposed in a housing or other assembly of any kind found useful for disposing and maintaining them in a desired arrangement. In embodiments, the attachment may include a self-affixing fastener or attachment. In embodiments, the attachment may be a releasable attachment and/or the automation device may be releasably installable on the fixture. In embodiments, an automation device may be adapted and configured for modification-free installation on a fixture; that is, capable of being installed without any need for alteration, complete or partial dismantling, or other modification of the fixture.

In embodiments, there is provided a system for controlling a plurality of user-controllable fixtures, the system including: a plurality of automation devices each adapted and configured for installation to a fixture, in engagement with a physically operable control, if any, of the fixture; and a control device configured to communicate at least one signal to each of the automation devices. In embodiments, a control device may be pre-programmed, user programmable, and/or controllable by real time or other inputs, or in any other manner. In embodiments, a control device may be incorporated into an automation device, or may include a separate device, such as, for example, a wireless device, an infrared device, a Bluetooth device, a BLE device, a Wi-Fi device, a smart phone, a tablet computer, or a personal computer. In embodiments, installation to a fixture may include self-affixing attachment of an automation device to a fixture or portion thereof. In embodiments, installation to a fixture may include releasable attachment of an automation device to a fixture or portion thereof. In embodiments, at least one automation device of the system may be installable without any need for alteration, complete or partial disassembly, or other modification of the fixture to which it is installed. In embodiments, a system for controlling a plurality of fixtures may include one or more light switch automation devices, one or more electrical receptacle automation devices, one or more video subsystems according to the disclosure hereof, one or more other automation devices according to the disclosure hereof, or any combination of the foregoing. In embodiments, a control device could include a dispatch unit according to the disclosure hereon.

In some embodiments, there is provided a system including a first wireless device; a second wireless device; a first wireless communication channel between the first wireless device and the second wireless device; and a second wireless communication channel between the first wireless device and the second wireless device. In embodiments, the effective range of the first wireless communication channel may be greater than the effective range of the second wireless communication channel, and/or the power demand of the second wireless communication channel may be less than the power demand of the first wireless communication channel. In embodiments, the first wireless device is adapted and configured to maintain the first wireless communication channel in a quiescent state while awaiting receipt of an activation signal over the second wireless communication channel from the second wireless device, and to activate the first wireless communication channel and transmit data on the first wireless communication channel upon receipt of the activation signal. In embodiments, the quiescent state may be a power-off state. In some embodiments of such a system the second wireless communication channel may include a connection selected from a Bluetooth connection, a Bluetooth Low Energy, connection, and a Zigbee connection. In embodiments of a system the first wireless communication channel may include a Wi-Fi connection. In embodiments of a system the first wireless communication channel may include a wireless connection having a range of at least 3 m, or at least 5 m, or at least 10 m, or at least 15 m, or at least 20 m, or at least 25 m, or at least 50 m, or at least 100 m. In some embodiments of such a system the second wireless communication channel may include a connection having average power demand in normal use less than approximately 0.01 mA, or less than approximately 0.05 mA, or less than approximately 0.1 mA, or less than approximately 0.25 mA. In embodiments of a system the second wireless communication channel may include at least one repeater. In embodiments of such a system the second wireless device may include a hub. In some embodiments of a such a system the transmission of the activation signal by the second wireless device may be remotely controllable by a user; and/or the first wireless device may be adapted and configured to deactivate the first wireless communication channel from an activated state to a quiescent state upon receipt of a deactivation signal from the second wireless device; and/or transmitting data on the first wireless communication channel upon receipt of the activation signal may include transmitting video data; and/or the first wireless device may be adapted and configured to transmit data to a third wireless device upon receipt of the activation signal; and/or the first wireless communication channel may remain in a quiescent state at least 70 percent, or at least 80 percent, or at least 90 percent, or at least 95 percent, or at least 99 percent, of the time during normal operation of the system.

In some embodiments there is provided a smart home system including a plurality of wireless devices, a Wi-Fi or other high performance communication channel adapted and configured for communication thereon by at least one of the wireless devices, and a BLE or other low-power-demand channel for continuous communication between the wireless devices, wherein the connection of the at least one of the wireless devices to the high performance communication channel is adapted and configured to remain in a quiescent state, which could be a power-off state, until activated in response to an activation signal transmitted over the low power demand channel.

In some embodiments a smart home peripheral device could include a data source; a first wireless transceiver adapted and configured to transmit data from the data source and a second wireless transceiver adapted and configured to receive an activation signal, wherein the transmitting range of the first wireless transceiver is greater than the transmitting range of the second wireless transceiver, and the power demand of the second wireless transceiver is less than the power demand of the first wireless transceiver. Such a device could include a controller adapted and configured to respond to the receipt via the second wireless transceiver of an activation signal by activating the first wireless transceiver from a quiescent state and controlling the first wireless transceiver to transmit data from the data source. In embodiments the first wireless transceiver and second wireless transceiver could be combined or integrated in a single device or component and/or may interact with common components such as a common power source, amplifier, antenna, or other component. In embodiments, a data source could include a camera, and/or a memory or machine readable medium, and/or a device could include a user interface operably connected to a controller and adapted and configured to communicate an instruction to the controller.

In embodiments, there may be provided a device including a camera, a low power demand wireless receiver, a high capacity wireless transmitter, and a controller adapted and configured to control the high capacity wireless transmitter to transmit data from the camera upon receipt of an activation signal by the low power demand wireless receiver. In some such embodiments the device may include components and/or software providing hub functionality.

In embodiments, there is provided a method for power management in a wireless device adapted and configured to transmit data via a first wireless communication channel and receive a signal via a second wireless communication channel, wherein the data transmission capacity of the first wireless communication channel is greater than the data transmission capacity of the second wireless communication channel, and the power demand of the second wireless communication channel is less than the power demand of the first wireless communication channel. In embodiments, the method may include one or more of: with the wireless device in a quiescent state of the first wireless communication channel, receiving in the wireless device via the second wireless communication channel an activation signal, in response thereto entering an activated state of the first wireless communication channel and transmitting data via the first wireless communication channel, and thereafter returning to a quiescent state of the first wireless communication channel. In embodiments, the quiescent state could be a power-off state.

In some embodiments, a dispatch unit, camera unit, or smart home peripheral device incorporated into a smart home system may include a microcontroller to communicate with a wireless receiver and/or transmitter to handle logic for timers, proximity detection, schedules, or other smart features.

In some embodiments, a dispatch unit, camera unit, or smart home peripheral device incorporated into a smart home system may send data to and/or from an external wireless gateway device containing Wi-Fi and/or BLE modules or other wireless modules and/or protocols, allowing for control and status information of the devices from a remote location. In some embodiments, the wireless gateway is not necessary for the operation of the device, where, for example, the intended application does not require increased range of communication with the automation device. These wireless gateways may include, but are not limited to, personal computers, smart phones, and tablet devices.

Also disclosed herein are embodiments of novel methods, systems, devices, apparatus, compositions, articles of manufacture, and improvements thereof useful for providing, in a network that includes wirelessly communicating devices, functionality entailing relatively high power demands while minimizing power consumption. The innovations disclosed herein are of particular usefulness for IoT applications such as, for example, home automation systems and home security systems.

In embodiments, a dispatch unit, camera unit, or other device incorporated into a smart home system may that have the capability to communicate with one or more other devices in a network via a relatively higher capacity, higher range, and/or high power demand connection, such as, for example, a Wi-Fi connection, also have the capability to communicate with one or more other devices via a lower power connection, such as, for example, a Bluetooth Low Energy ("BLE") connection, and may maintain the high capacity connection in a power-off or quiescent state and activate and/or deactivate the high capacity connection in response to a signal transmitted over the low power connection, thereby conserving power while maintaining the ability to respond to conditions where increased capacity is needed.

Concluding Matter

The disclosed methods, systems, devices, apparatus, compositions, articles of manufacture, and improvements thereof have been explained above with reference to several embodiments. Other embodiments will be apparent to those skilled in the art in light of this disclosure. Certain aspects of the described subject matter may readily be implemented using configurations other than those described in the embodiments above, or in conjunction with elements other than those described above. For example, different components, algorithms and/or logic circuits, perhaps more complex than those described herein, may be used.

It should also be appreciated that the described subject matter can be implemented in numerous ways, including as a process, an apparatus, or a system. The methods described herein may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc., or communicated over a computer network wherein the program instructions are sent over optical or electronic communication links. It should be noted that the order of the steps of the methods described herein may be altered and still be within the scope of the disclosure.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the disclosed subject matter is described with reference to specific embodiments thereof, but those skilled in the art will recognize that the invention is not limited thereto. Various features and aspects of the above-described subject matter may be used individually or jointly. Further, the described subject matter can be utilized in any number of environments and applications beyond those described herein without departing from the broader spirit and scope of the specification. The specification and drawings are, accordingly, to be regarded as illustrative rather than restrictive.

In the foregoing disclosure, specific functions may be attributed to specific components or modules. It will be apparent that the functional boundaries between components or modules are substantially artificial; functionality attributed to two or more modules or components could equivalently be combined in a single module or component, and functionality attributed to a single module or component could equivalently be divided between two or more modules or components. The disclosure hereof extends to all such equivalent arrangements.

Except as otherwise specifically stated or required by context, directional terms are not intended to be limiting or to imply that the apparatus or object must be used in any particular position or orientation.

In embodiments, components and/or substructures described herein as having fixed positions relative one to another may be held in position in any manner operable to maintain the specified positions under conditions of normal use as described herein, such as, by way of example only, by the use of mechanical fasteners such as bolts, screws, nuts, or rivets; by heat, such as, for example, welding, brazing, or soldering; by an adhesive; by incremental deposition, such as, for example, by 3D printing; and/or by forming a component integrally or as a single piece with another component. In embodiments, components and/or substructures described herein as having movable positions relative one to another may be constrained in position in any manner operable to constrain the components and/or substructures within the specified ranges of positions under conditions of normal use as described herein, such as, by way of example only, by the use of mechanical fasteners such as hinges, sliders, tracks, followers, pivots, bearings, and/or flexible components. Unless otherwise specifically stated or required by context, mounting and/or affixation may be permanent or removable or removable and replaceable, as deemed useful for an application of interest.

For clarity and to ensure completeness, certain of the aspects and/or embodiments disclosed herein may be overlapping in scope, described repetitively, or represent recitals of the same or equivalent elements or combinations expressed in alternative language. It will be apparent that the choice of particular phraseology and/or of particular aspects or elements to assert as claims involves many complex technical and legal considerations, and no inference should be drawn that alternative descriptions of a particular element or combination in this written description necessarily do or do not encompass different subject matter; except where context otherwise requires, each described aspect or element should be interpreted according to its own description.

It is intended that this specification be interpreted in accordance with the normal principles of English grammar and that words and phrases be given their ordinary English meaning as understood by persons of skill in the pertinent arts except as otherwise explicitly stated. If a word, term, or phrase is intended to be further characterized, specified, or narrowed in some way, then additional adjectives, modifiers, or descriptive text have been included in accordance with the normal principles of English grammar. It is intended that the meanings of words, terms, or phrases should not be modified or characterized in a manner differing from their ordinary English meaning as understood by persons of skill in the relevant arts except on the basis of adjectives, modifiers, or descriptive text that is explicitly present.

Except as otherwise explicitly stated, terms used in this specification, including terms used in the claims and drawings, are intended as "open" terms. That is, for example, the words "including" and "comprising" should be interpreted to mean "including but not limited to," the word "having" should be interpreted to mean "having at least," the word "includes" should be interpreted to mean "includes but is not limited to," the phrases "for example" or "including by way of example" should be interpreted as signifying that the example(s) given are non-exhaustive and other examples could be given, and other similar words and phrases should be given similar non-exclusive meanings. Except as explicitly stated, ordinals used as adjectives (e.g. "first object", "second object", etc.) in this specification, including claims and drawing figures, are intended merely to differentiate and do not imply that any particular ordering is required. Thus, for example, unless otherwise explicitly stated, "first measurement" and "second measurement" do not imply that the first measurement necessarily takes place before the second measurement, but merely that they are distinct measurements.

In the written description and appended claims, the indefinite articles "a" and/or "an" are intended to mean "at least one" or "one or more" except where expressly stated otherwise or where the enabling disclosure requires otherwise. The word "or" as used herein is intended to mean "and/or", except where it is expressly accompanied by the word "either", as in "either A or B". Applicants are aware of the provisions of 35 U.S.C. § 112(f). The use of the words "function," "means" or "step" in the written description, drawings, or claims herein is not intended to invoke the provisions of 35 U.S.C. § 112(f), to define the invention. To the contrary, if the provisions of 35 U.S.C. § 112(f) are sought to be invoked, the claims will expressly include one of the exact phrases "means for performing the function of" or "step for performing the function of". Moreover, even if the provisions of 35 U.S.C. § 112(f) are explicitly invoked to define a claimed invention, it is intended that the claims not be limited only to the specific structure, material or acts that are described in the preferred embodiments, but in addition, extend to any and all structures, materials or acts that perform the claimed function as described in alternative embodiments or forms of the invention, or that are well known present or later-developed equivalent structures, material or acts for performing the claimed function.

Any of the methods of the present disclosure may be implemented in whole or part in hardware, software, or both, or by a computer program, and may be carried out using any of the disclosed devices or apparatus according to any aspect or embodiment of the present invention, or in any other operable manner. Where reference is made to an "application" in the context of a program for a computing device, application may be implement in software, hardware, firmware, digital logic circuitry, analog circuitry, or any operable combination thereof, which persons of skill in the art will recognize as functionally equivalent.

In the foregoing description, various details, specific aspects, embodiments, and examples have been described in order to illustrate and explain the subject matter, to provide a thorough understanding of the various aspects, to enable persons skilled in the pertinent arts to practice the described subject matter, and to disclose the best mode of doing so known to applicants. These details, specific aspects, embodiments, and examples are not intended to be limiting; rather, it will be apparent to persons of skill in the relevant arts that, based upon the teachings herein, various changes, substitutions, modifications, rearrangements, may be made and various aspects, components, or steps may be omitted or added, without departing from the subject matter described herein and its broader aspects. Except as otherwise expressly stated or where aspects or features are inherently mutually exclusive, aspects and features of any embodiment described herein may be combined with aspects and features of any one or more other embodiments. Titles, headings, and subheadings herein are intended merely as a convenience for locating content, and do not limit or otherwise affect the interpretation of the content of the disclosure. The appended claims are intended to encompass within their scope any and all changes, substitutions, modifications, rearrangements, combinations of aspects or features, additions, and omissions that are within the spirit and scope of the subject matter as described herein and/or within the knowledge of a person of skill in the art. The scope of the invention is defined by the claims, and is not limited by or to the particular embodiments or aspects chosen for detailed exposition in the foregoing description, but rather extends to all embodiments or aspects as defined by the claims, as well as any equivalents of such embodiments or aspects, whether currently known or developed in the future.

I claim:

1. A video subsystem for a smart home ecosystem comprising a wireless internet access point, the subsystem comprising:
   a dispatch unit comprising a wireless receiver operable on a Wi-Fi protocol, a wireless transmitter operable on the Bluetooth Low Energy (BLE) wireless protocol, and an interface adapted and configured to operate the wireless transmitter to transmit an activation signal via the BLE protocol in response to an activation request received by the wireless receiver;
   a wire-free camera unit, comprising a wireless receiver operable on the BLE protocol, a camera sensor module, a self-contained power source, a Wi-Fi transmitter controllable to either of a default power-off state or an operating state, and a controller adapted and configured to, in response to an activation signal received directly from the dispatch unit via the wireless receiver of the camera unit, control the Wi-Fi transmitter to an operating state and operate the camera sensor and Wi-Fi transmitter to transmit a high-definition video transmission directly to the wireless internet access point, and thereafter return the Wi-Fi transmitter to its default power-off state;
   wherein the video subsystem implements a communication path comprising: Wi-Fi to Bluetooth Low Energy in the dispatch unit, then Bluetooth Low Energy to Bluetooth Low Energy wirelessly from the dispatch unit to the camera unit, then Bluetooth Low Energy to Wi-Fi in the camera unit, then Wi-Fi to Wi-Fi wirelessly from the camera unit to the wireless internet access point.

2. The video subsystem of claim 1, wherein the self-contained power source comprises at least one battery and the maintenance-free battery life of the wire-free camera unit is at least 18 months in normal usage with continuous monitoring for activation signals and video transmission averaging 5 minutes per day.

3. The video subsystem of claim 1, wherein the power consumption figure of merit of the camera unit is at least 2:1.

4. The video subsystem of claim 1, wherein the range of the wireless transmitter of the dispatch unit is extended by relaying transmissions over a mesh network.

5. The video subsystem of claim 1, wherein the operating range of the transmission of the activation signal by the dispatch unit to the camera unit is at least 43 meters.

6. The video subsystem of claim 1, further comprising an alert sensor adapted and configured to detect an event and thereupon communicate an alert signal to the controller of the camera unit, and the controller of the camera unit is adapted and configured to, upon receiving an alert signal, control the Wi-Fi transmitter of the camera unit to an operating state and operate the camera sensor and Wi-Fi transmitter of the camera unit to transmit a high-definition video transmission and thereafter return the Wi-Fi transmitter of the camera unit to its default power-off state, wherein the alert sensor comprises an event sensor selected from a motion sensor, an infrared sensor, a switch, a doorbell button, a temperature sensor, a smoke detector, an intrusion sensor, and an audio sensor.

7. The video subsystem of claim 1, further comprising a smart phone application operable, when installed on a smart phone, to receive from a user a command to activate the camera unit, and thereupon relay a control signal to the dispatch unit over a communication channel comprising an internet access point.

8. The video subsystem of claim 1, further comprising a smart phone application operable, when installed on a smart phone, to receive from a user a command to activate the camera unit, and thereupon relay a control signal to the dispatch unit via a direct wireless transmission from the smart phone to the dispatch unit.

9. The video subsystem of claim 1, further comprising a smart phone application operable, when installed on a smart phone, to receive a video transmission transmitted by the camera unit and relayed to the smart phone over a communication channel comprising an internet access point.

10. The video subsystem of claim 1, further comprising a smart phone application operable, when installed on a smart phone, to receive a video signal transmission transmitted by the camera unit and relayed directly to the smart phone using a Wi-Fi protocol.

11. The video subsystem of claim 1, further comprising one or more smart home peripheral devices, each smart home peripheral device comprising a wireless receiver operable on a Bluetooth Low Energy wireless protocol, a controller for detecting an instruction signal received by the wireless receiver, and a functional unit controllable by the controller to perform a function in response to an instruction signal received via the wireless receiver.

12. The video subsystem of claim 1, wherein the dispatch unit and the camera unit are installable and operable with no permanent physical alteration of the installation site.

13. The video subsystem of claim 1, wherein the Wi-Fi transmitter of the camera unit is operable to transmit continuous video at a frame rate of at least 12 frames per second and a resolution selected from 1080p, 720p, 480p, and 360p.

14. The video subsystem of claim 1, wherein the average power drain on the self-contained power source of the camera unit is less than 150 uA when the Wi-Fi transmitter of the camera unit is in its default power-off state.

15. The video subsystem of claim 1, wherein the dispatch unit further comprises a wireless receiver adapted and configured to receive via a Bluetooth Low Energy wireless protocol a message transmitted by a source selected from: the camera unit, a smart home peripheral device, a smart phone, a tablet, and a computer.

16. A wire-free camera unit, comprising a wireless receiver operable on a Bluetooth Low Energy wireless protocol, a camera sensor module, a self-contained power source, a Wi-Fi transmitter controllable to either of a default power-off state or an operating state, and a controller adapted and configured to monitor the wireless receiver and, in response to an activation signal received via the wireless receiver, control the Wi-Fi transmitter to an operating state and operate the camera sensor and Wi-Fi transmitter to transmit a high-definition video transmission directly to a wireless internet access point and thereafter return the Wi-Fi transmitter to its default power-off state;
  wherein the wire-free camera unit is adapted and configured to be compatible with a communication path comprising conversion from Wi-Fi to Bluetooth Low Energy, then wireless transmission from a Bluetooth Low Energy transmitter to the Bluetooth Low Energy receiver of the camera unit, then Bluetooth Low Energy to Wi-Fi by the camera unit, then transmission by Wi-Fi to Wi-Fi wirelessly from the camera unit to a wireless internet access point.

17. The wire-free camera unit of claim 16, wherein the self-contained power source comprises at least one battery and the maintenance free battery life of the camera unit is at least 18 months in normal usage with continuous monitoring for activation signals and video transmission averaging 5 minutes per day.

18. The wire-free camera unit of claim 16, wherein the power consumption figure of merit of the camera unit is at least 2:1.

19. The wire-free camera unit of claim 16, wherein the Wi-Fi transmitter of the camera unit is operable to transmit continuous video at a frame rate of at least 12 frames per second and a resolution selected from 1080p, 720p, 480p, and 360p.

20. The wire-free camera unit of claim 16, wherein the average power drain on the self-contained power source of the camera unit is less than 150 uA when the Wi-Fi transmitter of the camera unit is in its default power-off state.

21. A method of using the wire-free camera unit of claim 16, the method comprising:
  via the wireless receiver, receiving an activation signal;
  in response thereto, controlling the Wi-Fi transmitter to its operating state;
  controlling the Wi-Fi transmitter to transmit a high-definition video transmission; and
  after completion of the high-definition video transmission, returning the Wi-Fi transmitter to its default power-off state.

22. A method of using the video subsystem of claim 1, the method comprising:
  from the wireless internet access point, transmitting a first wireless communication via a Wi-Fi protocol;
  in the dispatch unit, receiving the first wireless communication and in response thereto transmitting a second wireless communication via a Bluetooth Low Energy (BLE) protocol;
  in the wire-free camera unit, receiving the second wireless communication and in response thereto transmitting a third wireless communication via a Wi-Fi protocol;
  at the wireless internet access point, receiving the third wireless communication.

* * * * *